United States Patent [19]
Black et al.

[11] Patent Number: 5,757,858
[45] Date of Patent: May 26, 1998

[54] DUAL-MODE DIGITAL FM COMMUNICATION SYSTEM

[75] Inventors: Peter J. Black, St. Lucia, Australia; Nathaniel B. Wilson, San Diego, Calif.

[73] Assignee: Qualcomm Incorporated, San Diego, Calif.

[21] Appl. No.: 779,601

[22] Filed: Jan. 7, 1997

Related U.S. Application Data

[63] Continuation of Ser. No. 373,122, Dec. 23, 1994.

[51] Int. Cl.⁶ .................. H04L 27/10; H04J 13/02; H04B 1/04; H04B 1/16
[52] U.S. Cl. .................. 375/295; 375/303; 375/324; 375/334; 375/344; 375/345; 375/200; 455/214; 455/234.1; 455/257; 341/68; 370/342
[58] Field of Search .................. 375/200, 296, 375/272, 295, 303, 317, 324, 327, 334, 344, 345; 370/335, 342, 441, 479; 455/132, 142, 143, 205, 214, 234.1, 235.1, 257; 332/100; 341/68, 70

[56] References Cited

U.S. PATENT DOCUMENTS

| | | |
|---|---|---|
| 4,577,157 | 3/1986 | Reed .................. 455/214 |
| 4,603,300 | 7/1986 | Welles, II et al. .................. 455/214 |
| 4,675,882 | 6/1987 | Lillie et al. .................. 375/324 |
| 4,776,039 | 10/1988 | Akaiwa .................. 455/205 |
| 4,878,035 | 10/1989 | Vendely et al. .................. 375/303 |
| 4,944,025 | 7/1990 | Gehring et al. .................. 455/209 |
| 5,003,621 | 3/1991 | Gailus .................. 455/316 |
| 5,010,585 | 4/1991 | Garcia .................. 375/216 |
| 5,107,225 | 4/1992 | Wheatley, III et al. .................. 330/279 |
| 5,111,163 | 5/1992 | Erlich .................. 375/271 |
| 5,151,923 | 9/1992 | Fujiwara .................. 375/216 |
| 5,163,159 | 11/1992 | Rich et al. .................. 455/214 |

(List continued on next page.)

FOREIGN PATENT DOCUMENTS

| | | | |
|---|---|---|---|
| 0507401 | 10/1992 | European Pat. Off. | H03J 7/02 |
| 0508401 | 10/1992 | European Pat. Off. | H04L 27/14 |
| 9103871 | 3/1991 | WIPO | H03D 1/00 |
| 9210028 | 6/1992 | WIPO | H03G 3/30 |
| 9426024 | 11/1994 | WIPO | H04L 27/22 |
| 9530275 | 11/1995 | WIPO | H03G 3/30 |

*Primary Examiner*—Stephen Chin
*Assistant Examiner*—Jeffrey W. Gluck
*Attorney, Agent, or Firm*—Russell B. Miller; Roger W. Martin

[57] ABSTRACT

A dual-mode digital communication system for communicating an information signal during operation in frequency-modulated (FM) and multiple-access modes is disclosed herein. The digital communication system includes a dual-mode transmitter for transmitting the information signal using an FM communication signal during FM mode operation, and for transmitting the information signal using a multiple-access communication signal during multiple-access mode operation. The communication system further includes a dual-mode receiver for receiving the FM communication signal during FM mode operation, and for receiving the multiple-access communication signal during multiple-access mode operation. Incorporated within the dual-mode receiver is a digital demodulator for recovering the information signal from the received FM signal during operation in the FM mode, and for recovering the information signal from the received multiple-access signal during multiple-access mode operation. In a preferred implementation the dual-mode transmitter is disposed to convert a first sequence of binary data within the information signal into a sampled modulation waveform, and to provide the FM communication signal by modulating a carrier signal based at least in part on the sampled modulation waveform. The dual-mode transmitter may also be configured to multiplex a second sequence of wideband message data with the sampled modulation waveform so as to form a composite FM modulation waveform.

6 Claims, 24 Drawing Sheets

U.S. PATENT DOCUMENTS

| | | | |
|---|---|---|---|
| 5,212,826 | 5/1993 | Rabe et al. | 455/214 |
| 5,289,464 | 2/1994 | Wang | 370/69.1 |
| 5,289,496 | 2/1994 | Nakagawa et al. | 375/202 |
| 5,291,516 | 3/1994 | Dixon et al. | 375/200 |
| 5,299,228 | 3/1994 | Hall | 375/205 |
| 5,309,479 | 5/1994 | Cheah | 375/303 |
| 5,414,736 | 5/1995 | Hasegawa et al. | 375/272 |
| 5,436,590 | 7/1995 | Simard et al. | 375/334 |
| 5,436,955 | 7/1995 | Kaewell, Jr. et al. | 375/216 |
| 5,451,948 | 9/1995 | Jekel | 341/139 |
| 5,475,705 | 12/1995 | Dent | 375/333 |
| 5,539,770 | 7/1996 | Ishigaki | 375/216 |

| NRZ DATA | | WIDE BAND DATA WAVEFORM | | | | | | | |
|---|---|---|---|---|---|---|---|---|---|
| | | SECOND HALF OF X(n-1) | | | | FIRST HALF OF X(n) | | | |
| X(n-1) | X(n) | | | | | | | | |
| 0 | 0 | -50 | -51 | -52 | -51 | -50 | 51 | 52 | 50 |
| 0 | 1 | -50 | -51 | -52 | -53 | -53 | -53 | -52 | -50 |
| 1 | 0 | 50 | 51 | 52 | 53 | 53 | 53 | 52 | 50 |
| 1 | 1 | 50 | 51 | 52 | 51 | -50 | -51 | -52 | -50 |

FIG. 3E

| SHIFT | TIME CONSTANT | |
|---|---|---|
| 0 | 12.8S | TRACKING |
| 1 | 6.4S | |
| 2 | 3.2S | |
| 3 | 1.6S | |
| 6 | 200MS | ACQUISITION |
| 7 | 100MS | |
| 8 | 50MS | |
| 9 | 25MS | |

FIG. 9B

| SHIFT | TIME CONSTANT | |
|---|---|---|
| 0 | 1.6S | TRACKING |
| 1 | 0.8S | |
| 2 | 0.4S | |
| 3 | 200MS | ACQUISITION |
| 4 | 100MS | |
| 5 | 50MS | |
| 6 | 25MS | |
| 7 | 12.5MS | |

FIG. 14B

DUAL-MODE DIGITAL FM COMMUNICATION SYSTEM

This is a Continuation of U.S. application Ser. No. 08/373,122, filed Dec. 23, 1994.

BACKGROUND OF THE INVENTION

1. Field of the Invention

The present invention relates generally to frequency modulated (FM) communication systems. More particularly, the present invention relates to a novel dual-mode communication system selectively operative in either FM or code division multiple access (CDMA) modes.

2. Description of the Related Art

The demodulation of received FM communication signals is routinely performed using analog signal processing techniques. However, methods have recently been developed which allow analog communication signals to be processed using digital signal processing techniques. Included among such techniques are methods of phase sampling and discrimination of an incoming signal to recover message information. The message information is often recovered by using, for example, quadrature detection processes.

One FM demodulation technique suitable for digital implementation is known as "direct conversion". Using this technique, a direct conversion, or "zero-IF" receiver mixes the incoming RF signal directly down to baseband. The advantage of direct conversion is that channel selectivity filtering can be performed at baseband, and hence is conveniently implemented using integrated circuit technology.

One disadvantage of direct conversion demodulation is the unwanted DC offset voltages which may appear at the output of the mixer together with the desired baseband signal, which may also contain DC spectral components. The undesired DC offset voltage may arise from DC offsets originating within the mixer stage, as well as from RF local oscillator leakage being mixed down to DC. The effect of such undesired DC offsets upon the FM demodulation process can be modeled, for example, as a non-linearity applied to the ideal demodulated signal. The magnitude of the resulting distortion, i.e., the "offset error", is a function of the magnitude of the DC offset relative to the FM signal envelope. For typical audio applications, acceptable fidelity requires offset errors of less than a few percent. Hence, a need exists for a digital FM receiver capable of extracting the desired baseband signal from undesired DC offsets.

Direct conversion digital receivers also tend to exhibit a relatively narrow dynamic range. In order to accommodate the dynamic range of the received FM signal, additional automatic gain control (AGC) circuitry needs to be provided. Typically, in digital receivers, the automatic gain control process involves detection, analog-to-digital conversion and baseband measurement of the incident signal power. The measured value is compared with a desired reference value and an error value generated. The error value is filtered via a loop filter, and the filtered digital output used to control the amplifier gain so as to adjust the signal strength to coincide with the desired signal power. To effect digital demodulation with an optimal signal to noise ratio, automatic gain control is used to hold the magnitudes of the baseband waveforms close to the full dynamic range of the baseband analog to digital converters. However, this generally requires the provision of an automatic gain control amplifier to cover the full dynamic range of the received signal power.

In certain operating environments, a digital receiver may receive a signal which experiences rapid and wide variations in signal power. For example, in digital receivers such as are used in a code division multiple access (CDMA) mobile cellular telephones, it is necessary to limit the power of the received signal for proper processing of the received signal. Similarly, in digital receivers which are CDMA compatible and conventional FM compatible, i.e., dual-mode CDMA/FM receivers, it is necessary to provide power limiting of both wideband CDMA signals and narrowband FM signals. The limiting process is complicated by the differing dynamic ranges associated with the received FM and CDMA signal power. That is, the magnitude of received FM signals may vary over a dynamic range as large as 110 dB in cellular systems, whereas existing power control techniques within CDMA systems typically result in a much more limited dynamic range, i.e., approximately 80 dB.

The provision of separate AGC circuitry for each of the modes of dual-mode CDMA/FM receivers increases the hardware complexity and expense of such receivers. Accordingly, it would be desirable to provide AGC circuitry capable of operating both upon narrowband, wide-dynamic range FM signals, as well as upon wideband CDMA signals of more limited dynamic range.

Within digital FM receivers, a number of techniques have been employed to effect digital FM demodulation. Commonly used techniques include IF demodulation using zero crossing counts, or baseband demodulation using quadrature detection.

An exclusively digital approach to quadrature FM demodulation is described in U.S. Pat. No. 4,675,882, entitled *FM Demodulator*, assigned to Motorola, Inc. The '882 patent describes an apparatus designed to process sampled input vectors comprising a quadrature FM signal centered substantially at zero frequency. The quadrature input vectors are scaled to lie within a predetermined magnitude range. In addition, the input vector is rotated to a predetermined quadrant based on a coarse phase value produced by a phase accumulator. Within the predefined quadrant a fine phase value is determined based on the rotated vector, with the fine and coarse phase values being summed and output as a composite phase value. Successive composite phase samples are then subtracted in order to produce a demodulated message sample sequence.

Various characteristics of the demodulation apparatus of the '882 patent strongly favor implementation of the device within digital signal processors rather than using dedicated digital hardware. For example, the '882 apparatus relies upon a digital reciprocator to produce an inverse of an in-phase baseband signal component prior to multiplication with an out-of-phase baseband component. In a preferred approach the reciprocator approximates the function f(x)= 1/x by using a Chebyshev polynomial approximation, which is most conveniently carried out on a digital signal processor. Unfortunately, the relatively high power consumption of such digital signal processors is a disadvantage compared to dedicated digital hardware for various types of portable communication transceivers, such as personal communication devices.

In addition, it is believed that the demodulation apparatus in the '882 patent is susceptible to DC offset errors arising from local oscillator leakage, as well as from various other sources of undesired DC feed through. That is, the apparatus of the '882 patent maps DC signal energy within the input waveform directly to zero-frequency baseband, at which are also present the desired quadrature baseband signal components. Accordingly, the resultant phase angle estimation may become corrupted in the presence of significant extraneous DC signal energy.

Signal filtering is often performed using intermediate frequency (IF) filters in order to achieve adequate out of band signal rejection. Although the requisite signal rejection capability may be achieved through the use of ceramic IF filters, these tend to be relatively large and expensive. Smaller and less expensive IF filters are generally incapable of being realized so as to possess the desired signal rejection characteristics, and hence are generally not employed in FM cellular telephone receivers.

As is well known, recent advances in integrated circuit (IC) technology have made possible the realization of active baseband filters which are quite small and inexpensive. It follows that it would be desirable to employ active IC baseband filters to effect significant out of band signal rejection, thereby allowing small and inexpensive IF filters to be used to provide any additional required signal rejection. It is also known that the rejection capability of an active filter is a function of filter gain, but that higher gain active baseband IC filters exhibit an increased susceptibility to undesirable DC bias offsets. This increased susceptibility may be attributed to increased amplification of offset sources. That is, these spurious DC signal components are amplified by the active baseband IC filter, and will act as a noise source in the FM demodulator.

Accordingly, the employment of active baseband IC filters leads to the necessity of providing some mechanism for suppression of undesired DC offsets. Unfortunately, the IF processing chain of conventional digital receivers typically includes a local oscillator (L.O.) having a frequency selected such that the RF carrier frequency is down converted to DC, thereby resulting in the destruction of the amplitude and phase information at the carrier frequency during the process of DC offset suppression. This is not a problem for digital demodulation of suppressed carrier signals, such as those transmitted using quadrature phase shift keying (QPSK) techniques. However, in FM cellular telephone systems significant amplitude and phase information is often present at the carrier frequency, and performance will be adversely affected if such information is destroyed.

In standard FM cellular telephone systems the voice information is typically passed through a high pass filter in order to suppress signal energy at frequencies below 300 Hz prior to being applied to the FM modulator. Although some voice information may be present in the FM waveform at frequency offsets of less than 300 Hz, such intermodulation products are nonstationary. Accordingly, the suppression of low-frequency intermodulation products does not usually result in the loss of appreciable voice information.

It is therefore a further object of the present invention to provide an AGC apparatus, for incorporation within a dual mode receiver, which is capable of effecting baseband filtering without loss of carrier frequency information.

SUMMARY OF THE INVENTION

The present invention is a novel dual-mode digital communication system for communicating an information signal during operation in frequency-modulated (FM) mode and code division multiple-access (CDMA) mode. The digital communication system includes a dual-mode transmitter for transmitting the information signal using an FM communication signal during FM mode operation, and for transmitting the information signal using a spread spectrum QPSK signal during CDMA mode operation.

The communication system further includes a dual-mode receiver for receiving the FM communication signal during FM mode operation, and for receiving the spread spectrum QPSK signal during CDMA mode operation. The dual mode receiver further includes a digital demodulator for recovering the information signal from the received FM signal during operation in the FM mode and for recovering the information signal from the received QPSK signal during CDMA mode operation.

With regard to the dual-mode receiver, an FM demodulator may be included within the digital demodulator in order to convert the digitized received baseband FM communication signal, preferably centered about a predefined baseband frequency offset from the zero frequency, into the recovered information signal. The conversion is performed such that each digital sample of the received baseband signal includes first and second sample components in phase quadrature. In a preferred implementation the FM demodulator initially calculates a ratio of the first and second sample components of each digital sample of the input signal. A phase demodulated signal is computed by determining the arctangent of each digital sample ratio. A frequency demodulated signal, equivalent to the demodulated information signal, is computed by filtering the demodulated phase sequence using a digital differentiator.

BRIEF DESCRIPTION OF THE DRAWINGS

FIG. 3E presents in tabular form the information illustratively represented in FIGS. 3A–3D.

FIG. 9B is a table listing a set of time constants at which the DC offset correction loop is set during operation in Tracking and Acquisition modes.

FIG. 14B is a table of time constants of the frequency tracking loop associated with selected loop gain constants.

DETAILED DESCRIPTION OF THE PREFERRED EMBODIMENT

Figure 1:
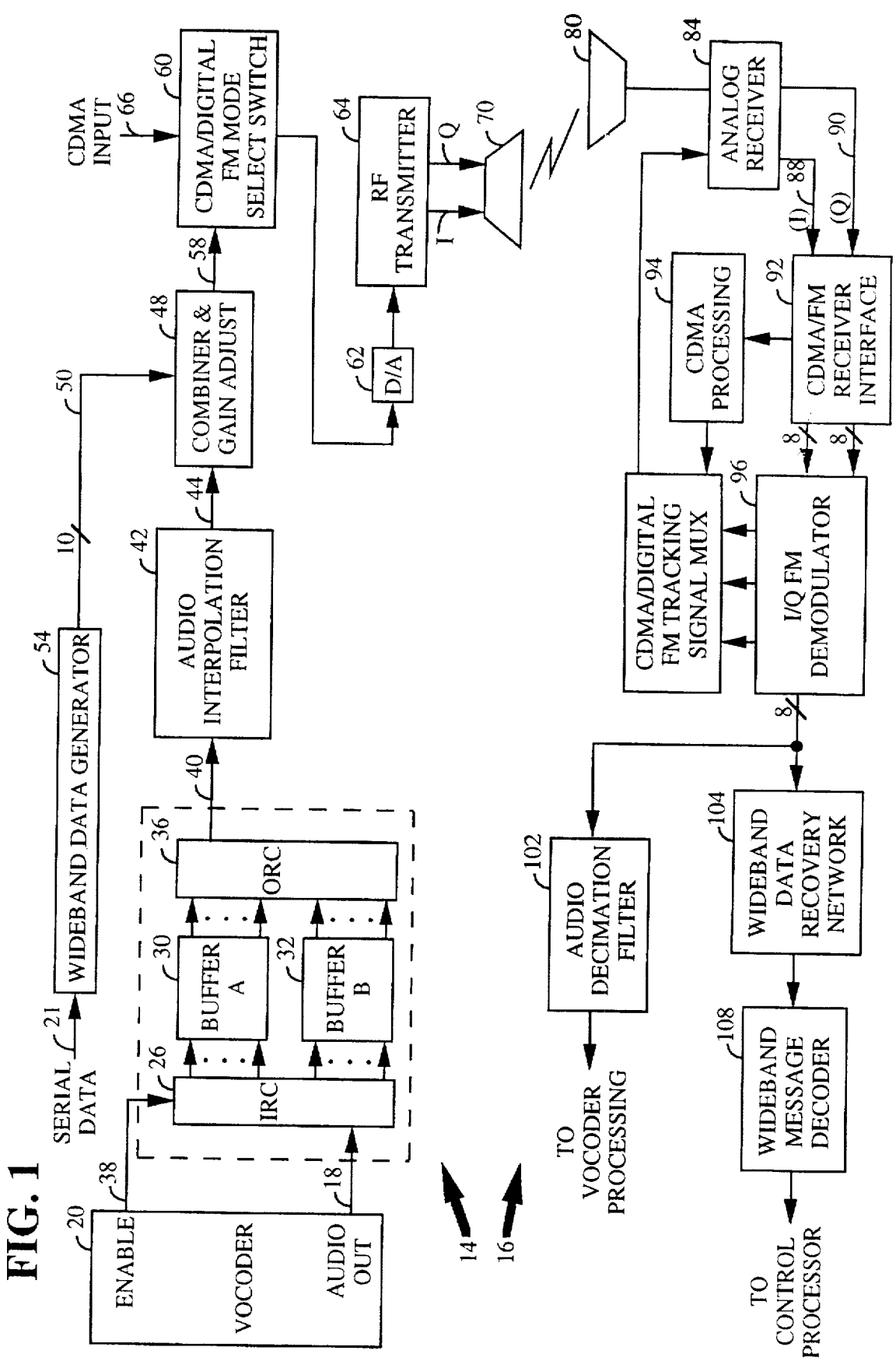
FIG. 1 provides an illustrative representation of a dual-mode digital communication system in accordance with the invention.

FIG. 1 provides an illustrative representation of a dual-mode digital communication system in accordance with the invention. The dual-mode communication system includes a dual-mode transmitter 14 disposed to transmit digital information signals to a dual-mode digital receiver 16. In a digital FM mode, the transmitted digital information signals are generated within the dual-mode transmitter through FM modulation of an RF carrier on the basis of digitized audio and wideband data signals. During a multiple-access mode of operation, the transmitted information signals comprise, for example, code-division multiple-access (CDMA) information signals. An FM/CDMA mode select signal provided to transmitter 14 by a control processor (not shown) allows selection of either the digital FM or CDMA mode of operation.

I. Overview of Dual-Mode Transmitter

Referring to FIG. 1, the digital FM processing chain of transmitter 14 is configured to receive sampled audio information signals 18 from a digital signal processor (DSP) 20, as well as to receive a serial stream of binary message data 21 from a control processor (not shown). In an exemplary embodiment, the sampled (e.g., 12-bit) audio information signals 18 are provided to an audio interpolation filter 42 of transmitter 14 at a rate of 20 kilosamples/second (ksps). As is described hereinafter, the interpolation filter 42 converts the 20 ksps sampled audio data into a 120 ksps stream of sampled audio data 44, where each audio sample 44 consists of 10 bits. The sampled audio data 44 is then combined within a combiner & gain adjust network 48 with a sampled wideband data waveform 50 provided by a wideband data waveform generator 54.

The composite digital FM modulation signal 58 produced by the combiner & gain adjust network 48 is provided to a mode select switch 60 within the CDMA/FM transmit interface. During digital FM mode operation, the CDMA/FM mode select switch 60 supplies the digital FM modulation signal to a digital to analog converter (DAC) 62. Within an RF transmitter 64 the resultant analog FM modulation signal directly modulates the frequency of an intermediate frequency carrier. Further details of a preferred manner in which the digital FM modulation signal is generated in accordance with the invention are provided below with reference to FIGS. 2–4.

Upon switching from operation in the digital FM mode to operation in the CDMA mode, a CDMA data signal carried by CDMA input line 66 is supplied to the RF transmitter 64 in lieu of the digital FM mode modulation signal. During CDMA mode operation the transmitter 64 generates in-phase (I) and quadrature phase (Q) pseudorandom noise sequences PNI and PNQ, which typically correspond to a particular area (i.e., cell) to which information is transmitted during CDMA mode operation. Within transmitter 64 the CDMA data signal is XOR'ed with the PNI and PNQ sequences so as to spread the CDMA data signal prior to transmission. The resulting I-channel code spread sequence and Q-channel code spread sequences are used to bi-phase modulate a quadrature pair of sinusoids. The modulated sinusoids are summed, band-pass filtered, shifted to an RF frequency, and again filtered and amplified prior to being radiated via antenna 70 over a communication channel to dual-mode receiver 16. An exemplary CDMA transmitter and waveform generator is described in, for example, U.S. Pat. No. 5,103,459, issued Apr. 7, 1992, entitled *System and Method for Generating Signal Waveforms in a CDMA Cellular Telephone System*, which is assigned to the assignee of the present invention and which is herein incorporated by reference.

II. Overview of Dual-Mode Receiver

Again referring to FIG. 1, the dual-mode receiver 16 includes a receive antenna 80 for receiving the I and Q channel information signals transmitted by dual-mode transmitter 14. During both CDMA and digital FM mode operation, the I and Q channel information signals received by antenna 80 are processed by a direct conversion analog receiver 84. Within the analog receiver 84, the I and Q channel information signals are mixed with a local oscillator signal to produce in-phase (I) and quadrature-phase (Q) baseband signals. During digital FM mode operation the local oscillator frequency is selected to be offset by a predetermined margin from the RF carrier frequency. In this way the received I and Q information signals are converted to I and Q digital FM baseband signals offset from zero frequency, i.e., from a "zero-IF", by the predetermined margin.

As mentioned previously, within conventional direct conversion FM receivers any undesired DC signal energy included within the input waveform is mapped directly to zero-frequency baseband, about which are centered the desired quadrature baseband signal components. As a result, the subsequent estimates of phase angle may become corrupted in the presence of significant extraneous DC signal energy. In accordance with the invention, the frequency offset purposely introduced within the analog receiver 84 allows such undesired DC signal energy to be removed during processing of the baseband I and Q signals.

During CDMA mode operation, the I and Q channel baseband CDMA signal components are seen to be provided via receiver output lines 88 and 90 to analog to digital converters (ADCs) 92 of the CDMA/FM receiver interface. The baseband CDMA signal components are then transferred from the ADCs 92 to a CDMA processing network 94.

Within the CDMA processing network 94, the baseband CDMA signal components are demodulated, deinterleaved and decoded in, for example, a manner such as is described in the above-referenced U.S. Pat. No. 5,103,459.

During digital FM mode operation, the baseband I and Q signals are provided to the ADCs 92 over the receiver output lines 88 and 90. Within the ADCs 92, the baseband I and Q signals are digitized at an exemplary rate of 40 kilosamples/second (ksps) to form 8-bit in-phase (I) and 8-bit quadrature-phase (Q) samples. The 8-bit I and Q samples are output at the exemplary 40 ksps rate to the I/Q FM demodulator 96. Within the digital FM demodulator 96 the I and Q baseband signals are demodulated into a phase signal, and are then further converted into a demodulated frequency signal. As is described in further detail hereinafter, the digital FM demodulator 96 also includes a DC offset tracking loop for removing the DC offset introduced during RF processing within the receiver 84, an automatic gain control (AGC) loop, and a frequency tracking loop.

Referring again to FIG. 1, during digital FM mode operation the demodulated frequency signal is provided at an exemplary 40 ksps data rate to both an audio decimation filter 102, and to a wideband data recovery network 104. After being processed by the decimation filter 102, the down-sampled audio signal is passed to a vocoder (not shown) for recovery of the received audio information. Contemporaneously, the wideband data recovery network 104 is operative to extract the received wideband data and timing information from the demodulated frequency signal. This extracted wideband signal information is then utilized by a wideband data message decoder 108 which functions to identify wideband data word frames, correct bit errors, and to forward the identified data words and messages to a control processor for further evaluation.

III. Detailed Description of Dual-Mode Transmitter

A. Audio Interpolation Filter

Figure 2:
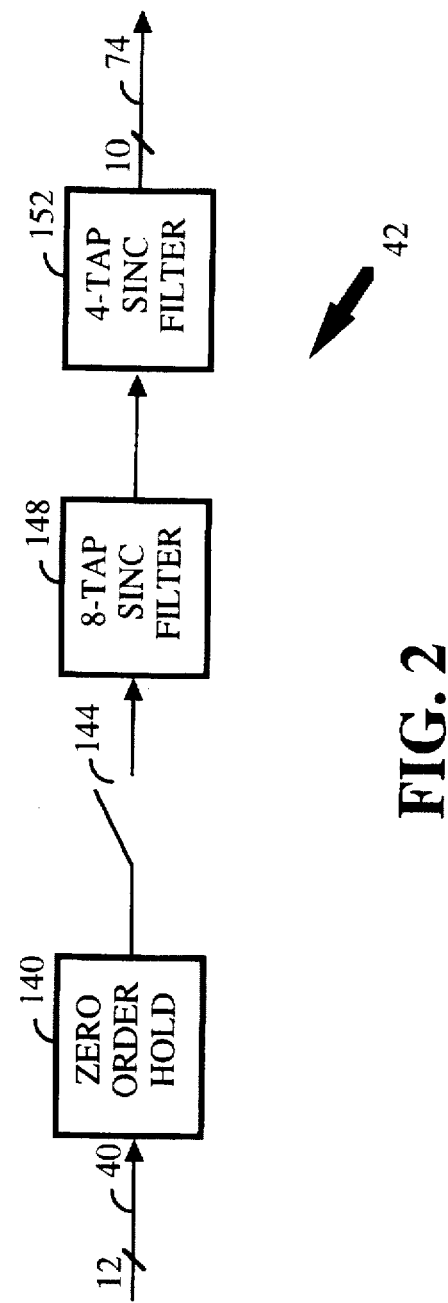
FIG. 2 shows a block diagram representation of an audio interpolation filter included within a dual-mode transmitter of the inventive communication system.
Figure 3A:
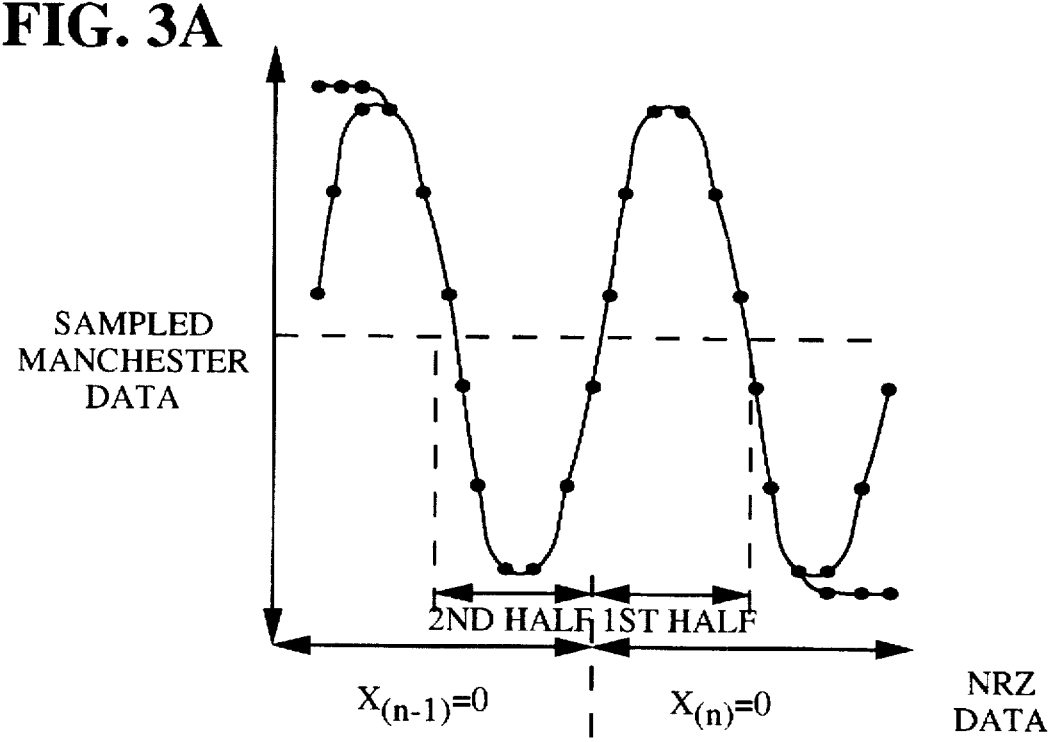
FIGS. 3A–3D illustratively represent a set of sampled, sinusoidal-like wideband waveforms produced by a wideband waveform generator included within the dual-mode transmitter in FM mode.
Figure 3B:
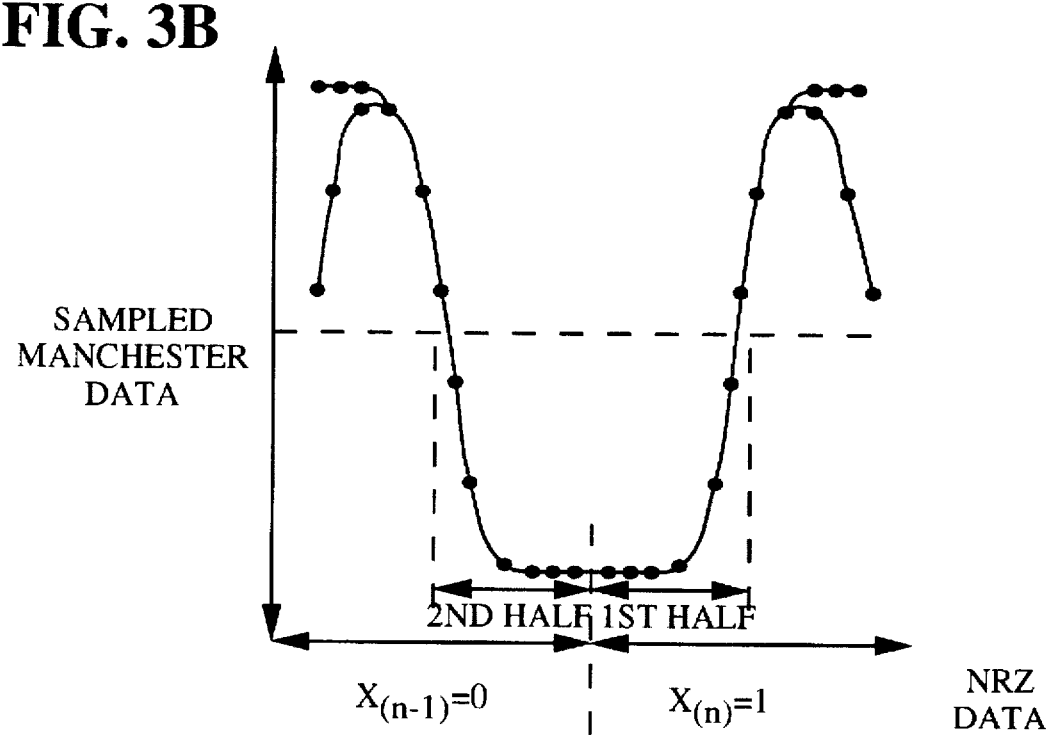
Figure 3C:
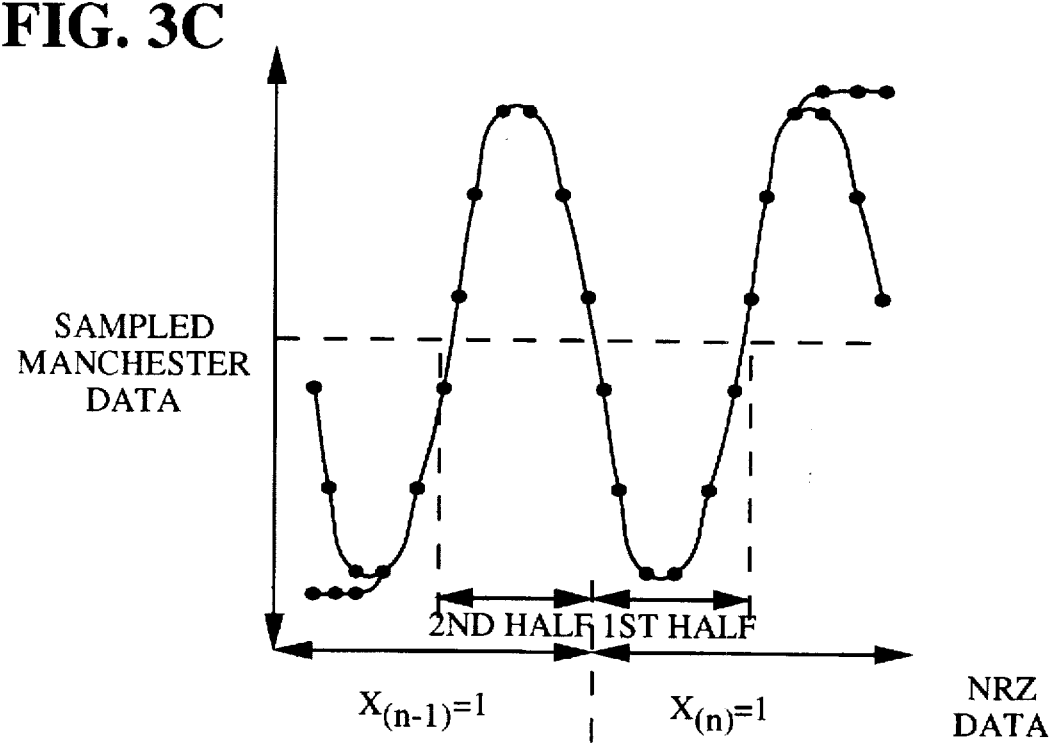
Figure 3D:
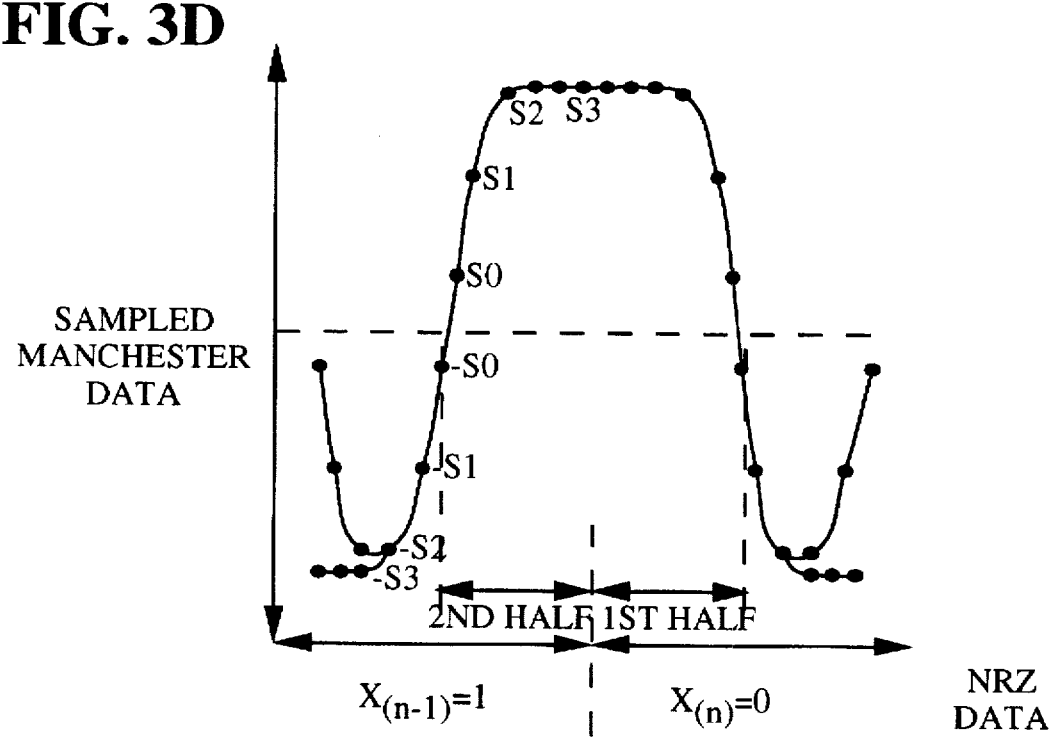

Turning now to FIG. 2, there is shown a block diagram representation of the audio interpolation filter 42. As is indicated by FIG. 2, each 12-bit sample of audio data from the digital signal processor 20 is provided at a 20 ksps rate over line 18 to a zero order hold register 140 within the audio interpolation filter 42. The output of the zero order hold register 140 is then sampled by an interpolating switch 144 at a rate equivalent to a predefined multiple of the input data rate. In the preferred embodiment the switch 144 is toggled at 120 kHz; that is, at six times the audio data input rate. The resultant 120 ksps sampled audio data is then sequentially processed by an 8-tap SINC filter 148 and by a 4-tap SINC filter 152. The 8-tap and 4-tap SINC filters 148 and 152 may be characterized by the following z-domain transfer functions T8 and T4, respectively:

$$T8=(1+z-1+\ldots+z-7)/8,$$

and $$T4=(1+z-1+\ldots+z-3)/4.$$

The 4-tap SINC filter 152 is seen to provide the 120 ksps stream of sampled audio data 44, where each audio sample 44 consists of 10 bits.

B. Wideband Data Waveform Generator

In a preferred embodiment, the wideband data waveform generator 54 is operative to directly synthesize a frequency-shift keyed (FSK) modulation waveform from the binary message data 21. When the message data 21 consists of a sequence of non-return to zero (NRZ) binary data, the waveform generator 54 both Manchester encodes the NRZ data sequence and synthesizes the FSK modulation waveform. Each NRZ logical one is Manchester encoded as a zero-one sequence, and each NRZ logical zero is Manchester encoded as a one-zero sequence. To limit the spectral bandwidth of the resulting FSK modulated waveform, the idealized transitions of the Manchester sequence are synthesized as sinusoidal-like transitions. The wideband data waveform generator is advantageously designed to obviate the need to low-pass filter the wideband data modulation signal prior to frequency modulation of the carrier.

FIGS. 3A–3D illustratively represent a set of sampled, wideband transition waveforms produced by the waveform generator 54 in response to various pairs of NRZ data bits. The first NRZ bit within each pair is identified along the horizontal axes of FIGS. 3A–3D by the notation X(n−1), and the second bit identified by the notation X(n). In the representations of FIGS. 3A–3D, twelve samples are generated in response to each bit of NRZ data in order to produce the sinusoidal-like representation corresponding to each Manchester data bit. Each of FIGS. 3A–3D depict twelve sample points corresponding to the last six samples of the Manchester waveform for NRZ bit X(n−1) and the first six samples of the Manchester waveform for NRZ bit X(n). The synthesized waveform values are defined by the predefined fixed constants ±s0, s1, s2 and s3. The information illustratively shown in FIGS. 3A–3D is presented in tabular form in FIG.

Figure 4:
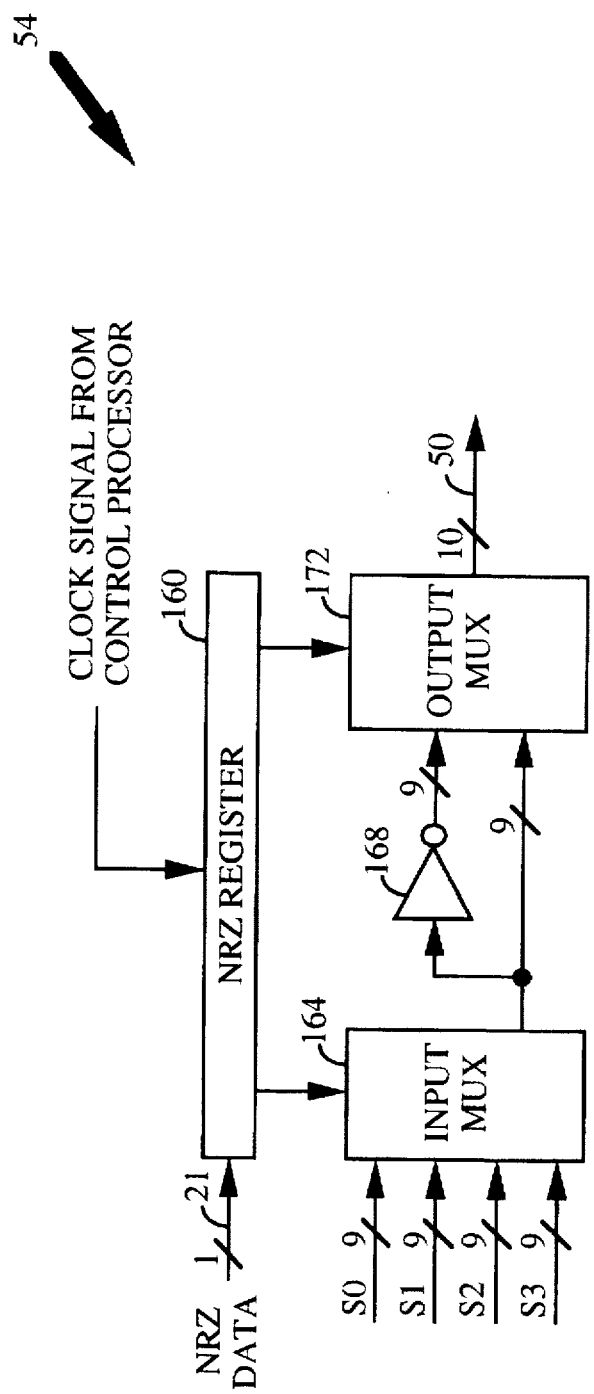
FIG. 4 provides a block diagram representation of a preferred implementation of the wideband data waveform generator.

Turning now to FIG. 4, there is shown a block diagram of a preferred implementation of the wideband data waveform generator 54. In the embodiment of FIG. 4, the input NRZ binary data is provided at an exemplary rate of 10 kilobits/s (kbps), and the sampled Manchester representation is generated at a rate of 120 kilosamples/second (ksps) with a sample resolution of 10 bits. The waveform generator 54 includes an NRZ data register 160 for storing successive pairs of NRZ binary data, X(n−1) and X(n). An input multiplexer 164 generates a sequence comprised of the values s0, s1, s2 and/or s3 based on the values of X(n−1) and X(n) stored within register 160. For example, FIG. 3E indicates that for X(n−1)=0 and X(n)=1, the multiplexer 164 will generate the sequence s0, s1, s2, s3, s3, s3, followed by the sequence s3, s3, s3, s2, s1, s0. These sequences, and the negatives of these sequences produced by inverter 168, are then provided to output multiplexer 172. For the exemplary case of X(n−1)=0 and X(n)=1, the output multiplexer 172 produces the sequence −s0, −s1, −s2, −s3, −s3, −s3 corresponding to the second half of X(n−1)=0, and the sequence −s3, −s3, −s3, −s2, −s1, −s0 corresponding to the first half of X(n)=1. In the general case the output multiplexer 172 selects between the sequence produced by the input multiplexer 164, and the complementary sequence produced by the inverter 168, in order to generate the sampled waveform associated with the pair of NRZ values X(n) and X(n−1) currently stored within the register 160.

C. Combiner and Gain Adjust Network

Figure 5:
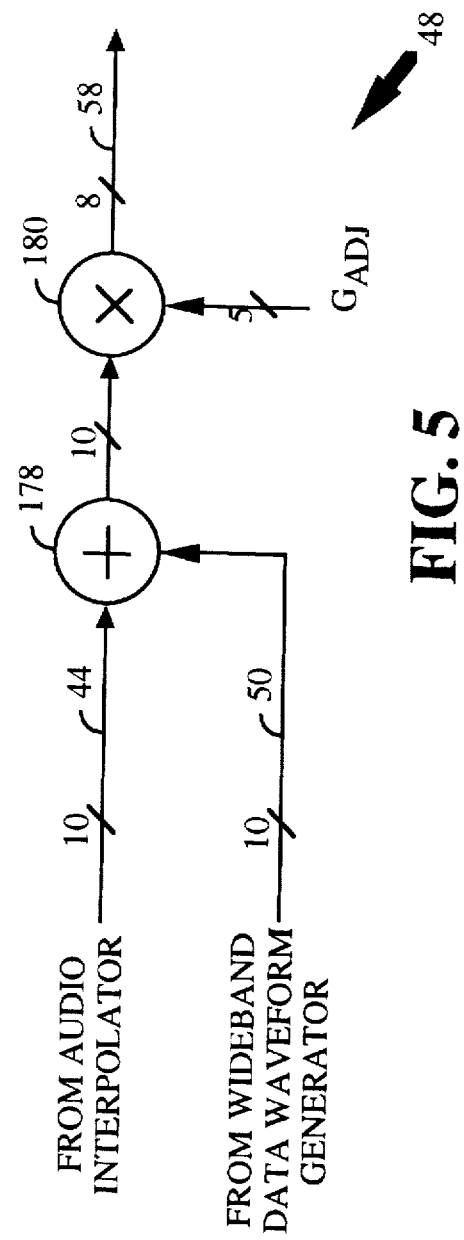
FIG. 5 shows a block diagram of a combiner & gain adjust network included within the dual-mode transmitter.

FIG. 5 shows a block diagram of the combiner & gain adjust network 48. The network 48 includes a digital adder 178 for combining the sampled audio data 44 with the sampled wideband data waveform 50 (FIG. 4). The resulting 10-bit sampled FM modulation signal is then scaled, within a multiplier 180, by a 6-bit gain adjustment constant $G_{ADJ}$. The constant $G_{ADJ}$ is selected to compensate for any deviation from a desired voltage-frequency response exhibited by a voltage-controlled oscillator (not shown) within the RF transmitter 64. The gain-adjusted digital FM modulation signal 58 from multiplier 180 is then provided to the CDMA/FM multiplexer 60.

D. CDMA/FM Interface Digital to Analog Converters

Figure 6:
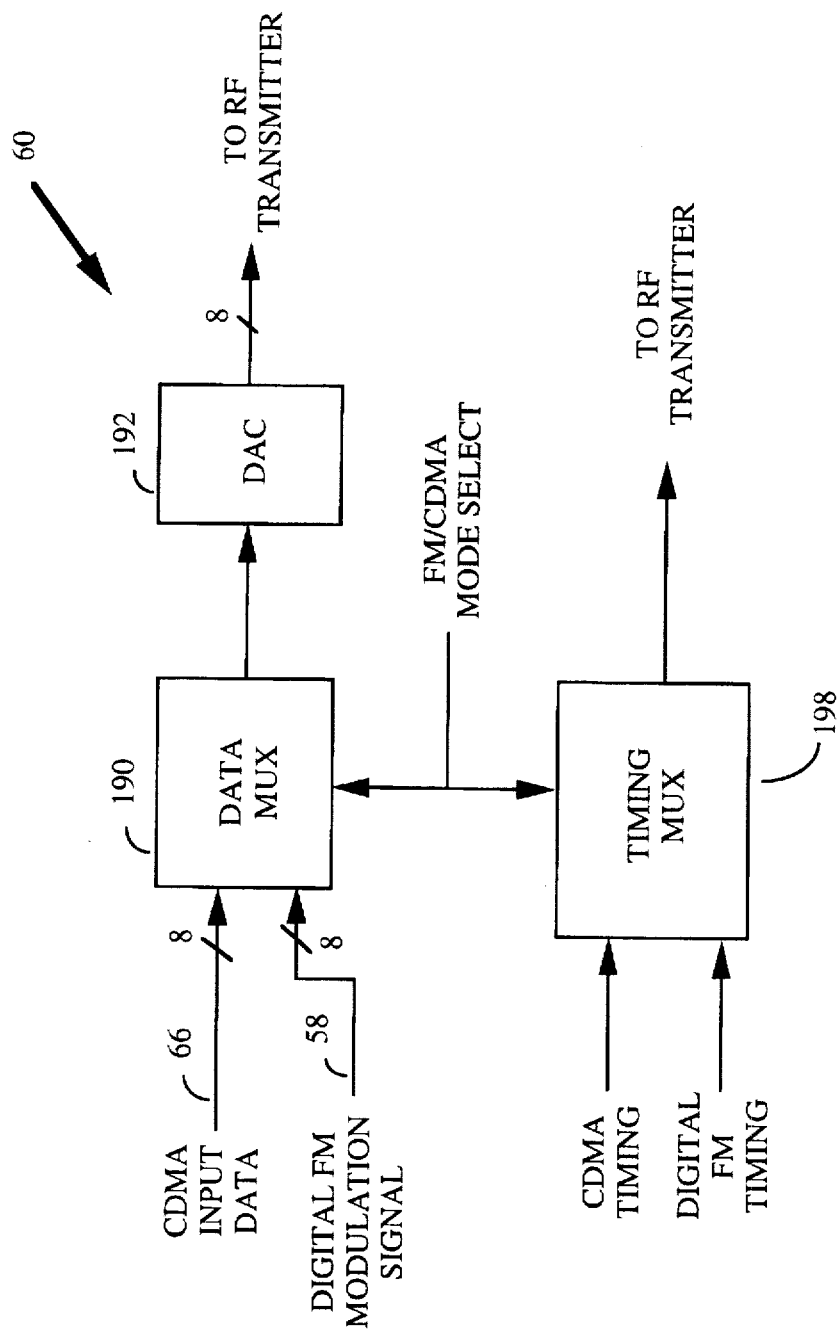
FIG. 6 shows a block diagram of a CDMA/FM multiplexer operative to selectively provide CDMA and digital FM modulation signals to an RF transmitter.

Referring now to FIG. 6, there is shown a block diagram of the CDMA/ FM Multiplexer 60. As is indicated by FIG. 6, a data multiplexer 190 receives both the CDMA data 66 and the digital FM modulation signal 58. The appropriate data stream is multiplexed to a digital to analog converter (DAC) 192 for conversion to an analog signal prior to output to the RF transmitter 64 (FIG. 1). Selection of the digital input stream for output is controlled by the FM/CDMA mode select signal applied to the data multiplexer 190. Similarly, either a CDMA clock signal, or a digital FM clock signal, is provided to the DAC 192 in order to synchronize the data conversion process to the timing of the input (i.e., FM or CDMA) data sequence.

IV. Detailed Description of Dual-Mode Receiver

A. Baseband Digital FM Demodulator

1. Structural Overview

Figure 7:
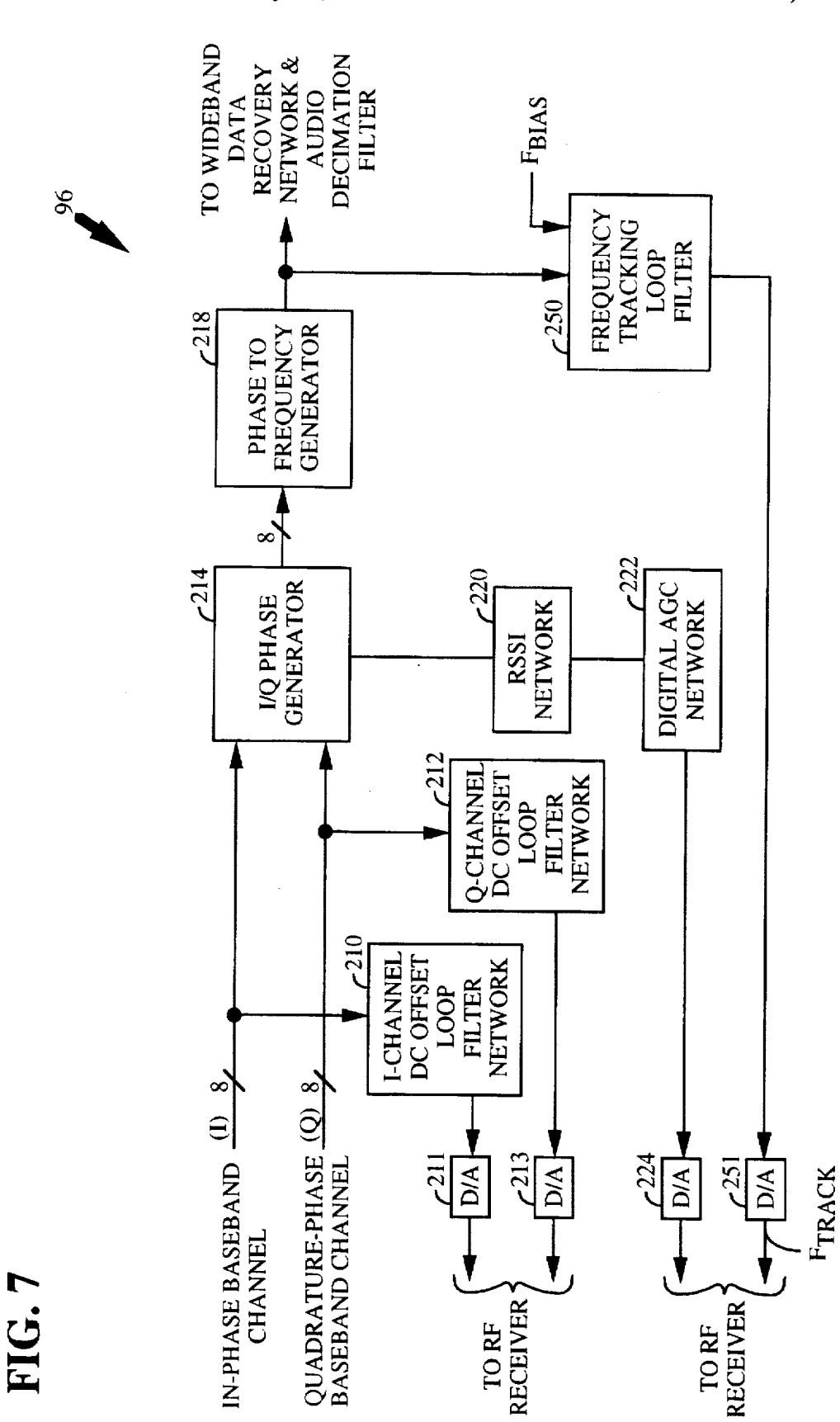
FIG. 7 shows a block diagram of a preferred implementation of an I/Q FM demodulator included within a dual-mode receiver of the invention.

Referring again to FIG. 1, during FM mode operation, the 8-bit in-phase (I) and 8-bit quadrature-phase (Q) samples are output from CDMA/FM receive interface ADCs 92 at a rate of 40 ksps to the I/Q FM demodulator 96. A block diagram of a preferred implementation of the I/Q FM demodulator 96 is shown in FIG. 7. The I and Q samples are respectively representative of the real and imaginary parts of a complex vector representation of a baseband equivalent of the received FM signal. In an exemplary implementation, the baseband equivalent signal is translated to a baseband frequency offset from the zero frequency (i.e., 0 Hz) by a predetermined margin. As noted above, the analog receiver 84 is designed to map those received signals which are offset from the RF center frequency by a predefined frequency margin, e.g. 150 Hz, to the zero frequency. Such a DC offset margin allows differentiation between an unmodulated FM signal, i.e., a continuous wave (CW) signal, and DC offset errors introduced during analog processing. In accordance with one aspect of the invention, DC offset errors remain at the zero frequency, while the frequency-translated CW signal is mapped to a non-zero baseband frequency equivalent to the predefined frequency margin (e.g., 150 Hz). As is described below with reference to FIG. 8, I-channel and Q-channel DC offset correction loop networks 210 and 212 are designed to remove this DC offset from the received signal path prior to further processing by the I/Q demodulator 96. The DC offset correction loops 210 and 212 advantageously allow removal of DC offset errors without destroying CW signal information.

The FM demodulator 96 further includes an I/Q phase demodulator 214 designed to produce an estimate of the phase angle of the received FM signal vector The function performed by the I/Q phase generator 214 may be expressed as:

$$P(n)=\arctan\{I(n)/Q(n)\},$$

where P(n) denotes the phase angle associated with the sample of the FM signal vector defined by I(n) and Q(n). An exemplary four-quadrant arc-tangent calculation yielding an estimate of the phase angle P(n) is as follows:

(i) compute $B=\min(|I|,|Q|)/\max(|I|/|Q|)$, (ii) determine an estimated phase value $P_e(n)$ within the range 0 to $\pi/4$, where $P_e(n)=TAN^{-1}(B)$, and iii) remap the phase estimate $P_e(n)$ into the range $\pi$ to $\pi$ based on the relative magnitudes of |I| and |Q|, and the signs of I and Q. The foregoing identifies one technique for performing a four-quadrant arc-tangent calculation, it being understood that alternate versions of this algorithm could be employed by those skilled in the art.

The sequence of phase estimates from the I/Q phase generator 214 are then converted to a frequency signal by a phase to frequency generator 218. In an exemplary implementation, the input to the phase to frequency generator 218 consists of an 8-bit normalized phase signal P(n), where 0<P(n)<2. The differentiation function performed by the phase to frequency generator 218 may be mathematically represented as follows:

$$F(n)=P(n)-P(n-1),$$

where F(n) is the frequency sample derived from the normalized phase samples P(n) and P(n-1). In a preferred implementation the frequency samples F(n) are normalized to a sequence of samples $F_N(n)$, such that $-1<F_N(n)<1$. The I/Q phase generator 214 and phase to frequency generator 218 are described in further detail below with reference to FIGS. 10 and 11.

Referring again to FIG. 7, an RSSI look-up network 220 calculates an estimate of received signal strength based on the parameters max(|I|,|Q|) and min(|I|,|Q|)/max(|I|,|Q|), both of which are provided by the I/Q phase generator 214. The resultant RSSI signal is then used within a digital automatic gain control (AGC) network 222 to create a digital AGC control signal, which is subsequently converted to an analog AGC signal by D/A converter 224.

As is indicated by FIG. 7, a frequency tracking loop filter 250 receives the frequency samples $F_N(n)$ produced by the phase to frequency generator 218. The frequency tracking loop filter 250 generates a digital signal which is converted to an analog frequency tracking signal ($F_{TRACK}$) by D/A converter 251. The signal $F_{TRACK}$ is employed within the analog receiver 84 for frequency adjustment of the local oscillator signal used in frequency down conversion of the received RF signal. As was noted above, the received I-channel and Q-channel FM signal energy is frequency translated within the analog receiver 84 to a baseband frequency different from 0 Hz in order to facilitate removal of undesired DC offset errors. Accordingly, a predefined, constant frequency bias ($F_{BIAS}$) is provided to the frequency tracking loop filter 250, and subtracted from the frequency samples $F_N(n)$ processed thereby, in order to compensate for the baseband offset introduced within the analog receiver 84.

2. Operational Description of FM Demodulator

Figure 8:
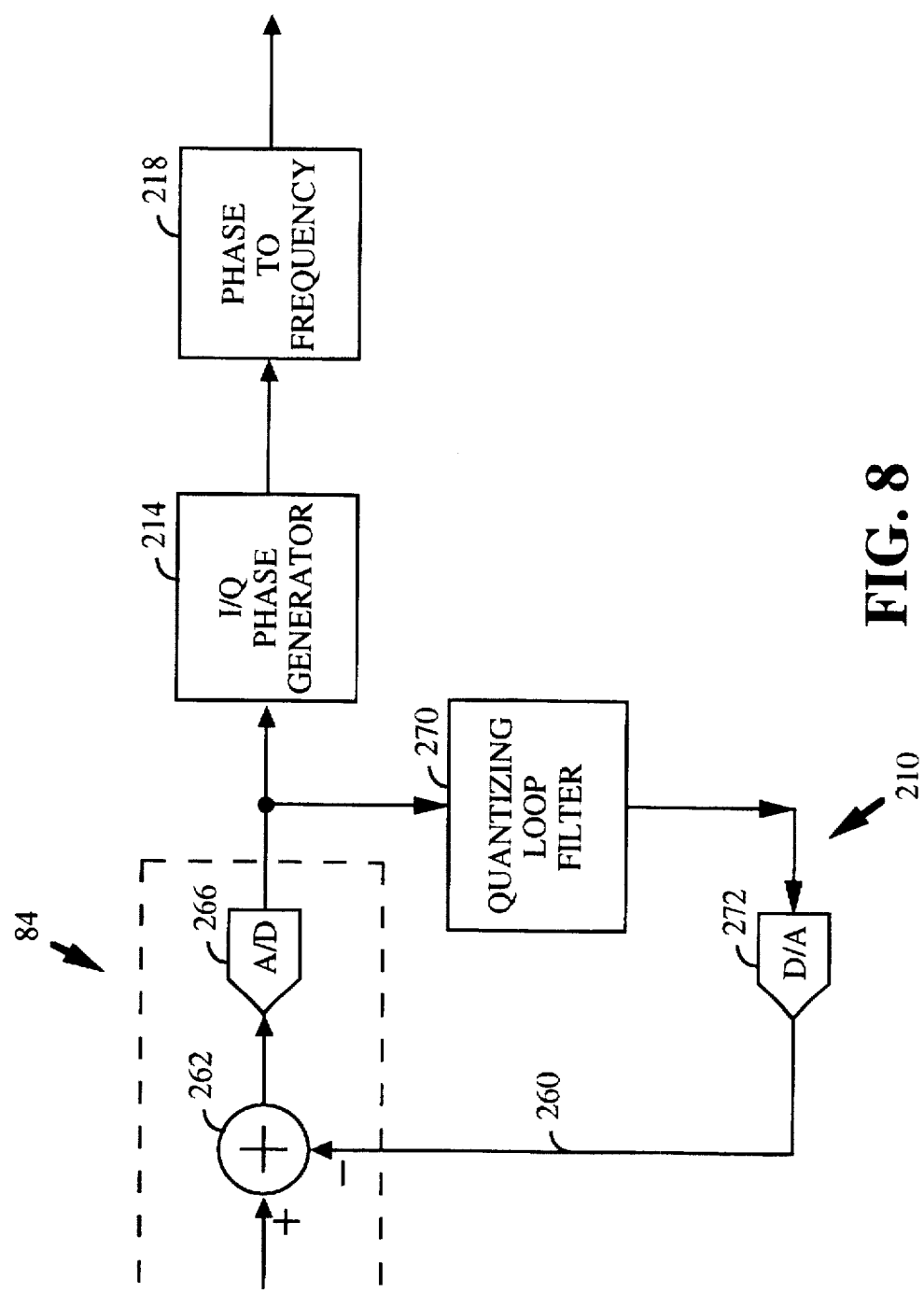
FIG. 8 shows a block diagram representation of the I-channel DC offset cancellation system.

Turning now to FIG. 8, there is shown a block diagram representation of the I-channel DC offset loop filter network 210, it being understood that the Q-channel DC offset loop filter network 212 is identical thereto. As is indicated by FIG. 8, the I-channel offset correction signal 260 produced by the loop filter network 210 is supplied to a subtraction circuit 262 within the baseband I-channel path. The loop filter network 210 is designed such that the I-channel correction signal 260 approximates any undesired DC offset present within the I-channel path. In this way the compensated signal produced by the subtraction circuit 262 is made to be substantially free of DC offset errors.

In operation, the digitized I-channel signal from an A/D converter 266 within the receiver 84 is quantized and filtered within a quantizing loop filter 270. The resultant digital I-channel correction signal is then converted to the analog I-channel correction signal 260 by D/A converter 272, and provided to the subtraction circuit 262.

Figure 9A:
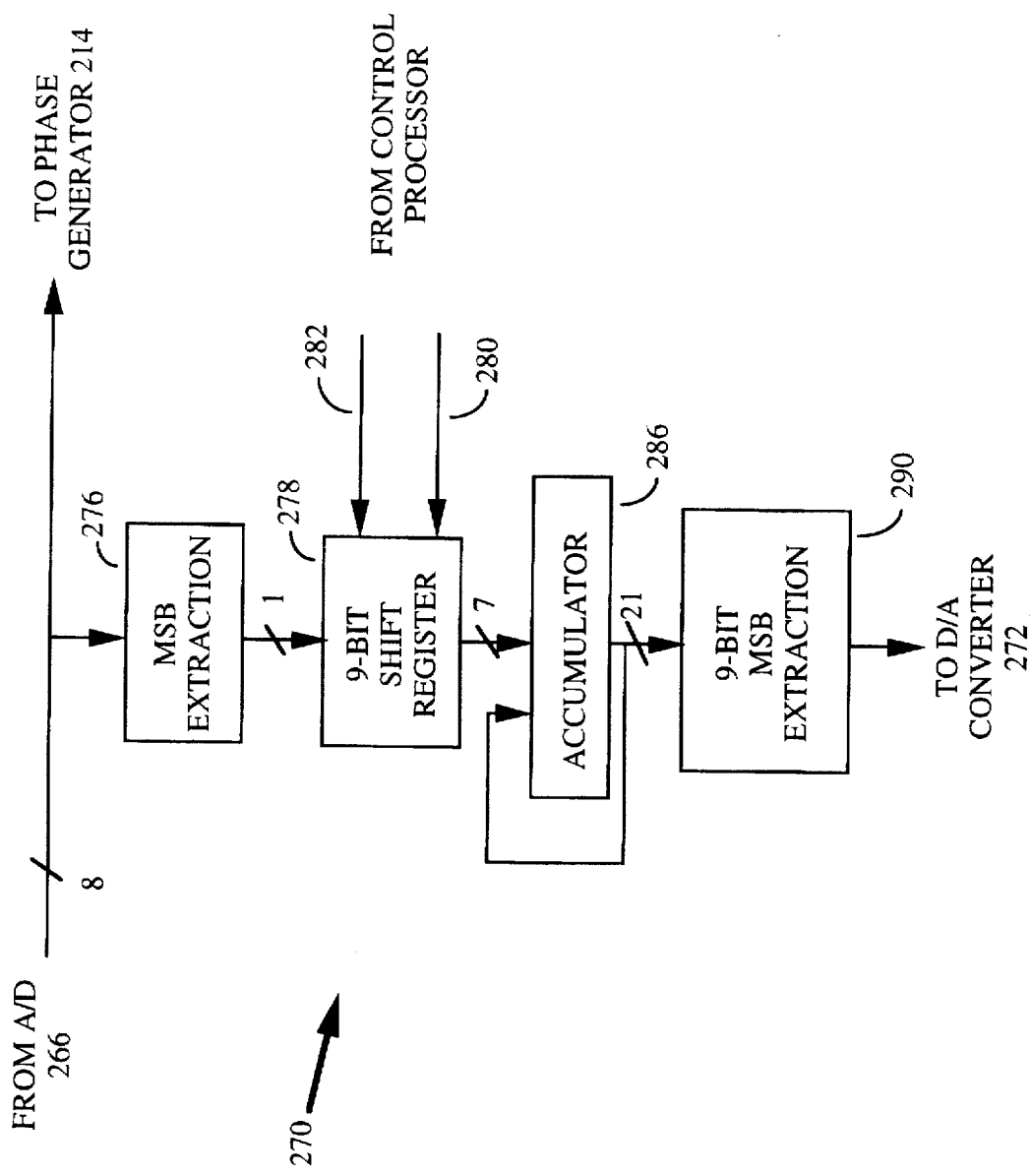
FIG. 9A provides a block diagram of a preferred implementation of a quantizing loop filter included within the I-channel DC offset loop filter network.

Referring now to FIG. 9A, a partially schematic representation is provided of a preferred implementation of the quantizing loop filter 270. The filter 270 includes an MSB extraction register 276 for supplying the most significant bit (MSB), i.e., the sign bit, of the 8-bit output of A/D converter to shift register 278. The time constant of the I-channel DC offset correction loop filter network 210 may be controlled by adjusting the number of shift bits 280 which, together with a two's complement bias signal 282, are provided to the shift register 278 by the receiver control processor. The 11-bit output of shift register 278 is supplied to an accumulator 286, which operates to provide a 21-bit sign-extended accumulated output to a 9-bit MSB extraction circuit 290. The extraction circuit 290 sends the nine MSB's of the 21-bit accumulated digital offset correction signal to the D/A converter 272 (FIG. 8), which produces the analog I-channel correction signal 260.

In particular, the table of FIG. 9B is indicative of the manner in which the bit shifts carried out within shift register 278 set the time constant of the DC offset correction loop. As is indicated by FIG. 9B, the DC offset correction loop is capable of operation in both TRACKING and ACQUISITION modes. Operation in the ACQUISITION mode is characterized by shorter loop time constants, which allows for rapid initial convergence of the offset correction. The relatively short loop time constants utilized in ACQUISITION mode increase the loop bandwidth relative to the TRACKING mode bandwidth, allowing larger offset errors to exist during ACQUISITION mode than in TRACKING mode. Conversely, the longer loop time constants, and hence narrower loop bandwidth, are used during TRACKING mode in order to minimize steady state offset errors. Such dual-mode operation allows initial convergence to be obtained with minimal delay, yet simultaneously enables optimization of steady-state performance.

Figure 10:
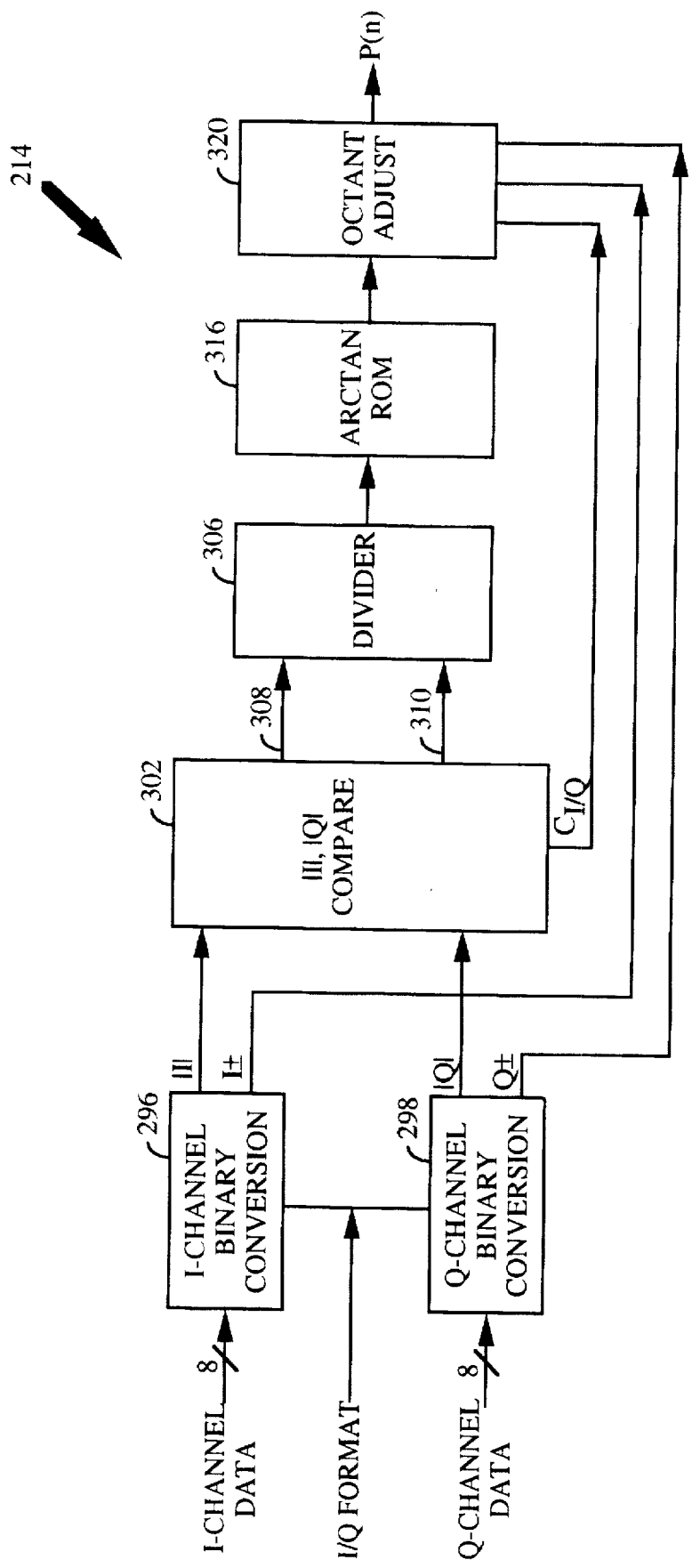
FIG. 10 provides a block diagram representation of an I/Q phase generator included within the I/Q FM demodulator.

Turning now to FIG. 10, there is shown a block diagram representation of the I/Q phase generator 214. The I/Q phase generator 214 includes I-channel and Q-channel binary conversion circuits 296 and 298 for determining the sign and magnitude of the I-channel and Q-channel baseband data. In a preferred implementation the I-channel and Q-channel baseband data is presented to the I-channel and Q-channel binary conversion circuits 296 and 298 in offset binary form.

For baseband data in an offset binary format, the conversion circuits 296 and 298 perform the function set forth in TABLE I. Namely, if the MSB of the input baseband data sample is a logic one, the absolute value (i.e., either |I| or |Q|) of the sample is equivalent to the sample's eight least significant bits (LSB's); otherwise, the absolute value is obtained by inverting the eight LSB's. The conversion circuits also produce sign values I± and Q±, respectively, indicative of the signs of the current I and Q channel baseband data samples.

TABLE I

| Offset Binary | Sign | Binary Absolute Value | Decimal Absolute Value |
|---|---|---|---|
| 1,1111,1111 | + | 1111,1111 | 255.5 |
| 1,1111,1110 | + | 1111,1110 | 254.5 |
| ... | + | ... | ... |
| 1,0000,0001 | + | 0000,0001 | 1.5 |
| 1,0000,0000 | + | 0000,0000 | 0.5 |
| 0,1111,1111 | − | 0000,0000 | −0.5 |
| 0,1111,1110 | − | 0000,0001 | −1.5 |
| ... | − | ... | ... |
| 0,0000,0001 | − | 1111,1110 | −245.5 |
| 0,0000,0000 | − | 1111,1111 | −255.5 |

Referring again to FIG. 10, a digital comparator 302 compares the |I| and |Q| values, and supplies min(|I|,|Q|) and max(|I|,|Q|), respectively, to digital divider 306 on signal lines 308 and 310. The comparator 302 also generates the control signal, $C_{I/Q}$. If |I|>|Q| the control signal $C_{I/Q}$ is set to one; otherwise, $C_{I/Q}$ is set to zero.

The divider 306 produces a 6-bit RATIO signal, where the RATIO signal is equivalent to min(|I|,|Q|)/max(|I|,|Q|). The RATIO signal is provided to an ARCTAN ROM table 316, and serves as an index into table 316. More particularly, the function THETA=arctan(RATIO) is stored within the table 316. The index RATIO ranges from 0 to 63 corresponding to the decimal range of 0 to 1, and the computed value THETA ranges from 0 to 31 corresponding to the decimal range of 0 to π/4. In an exemplary implementation, the ARCTAN ROM table 316 consists of the set of sixty-four 5-bit phase estimates set forth in TABLE II.

TABLE II

| Address | THETA | Address | THETA | Address | THETA | Address | THETA |
|---|---|---|---|---|---|---|---|
| 0 | 0 | 1 | 0 | 2 | 1 | 3 | 2 |
| 4 | 2 | 5 | 3 | 6 | 4 | 7 | 4 |
| 8 | 5 | 9 | 6 | 10 | 6 | 11 | 7 |
| 12 | 7 | 13 | 8 | 14 | 9 | 15 | 9 |
| 16 | 10 | 17 | 10 | 18 | 11 | 19 | 12 |
| 20 | 12 | 21 | 13 | 22 | 13 | 23 | 14 |
| 24 | 14 | 25 | 15 | 26 | 15 | 27 | 16 |
| 28 | 17 | 29 | 17 | 30 | 18 | 31 | 18 |
| 32 | 19 | 33 | 19 | 34 | 20 | 35 | 20 |
| 36 | 21 | 37 | 21 | 38 | 22 | 39 | 22 |
| 40 | 22 | 41 | 23 | 42 | 23 | 43 | 24 |
| 44 | 24 | 45 | 25 | 46 | 25 | 47 | 26 |
| 48 | 26 | 49 | 26 | 50 | 27 | 51 | 27 |
| 52 | 27 | 53 | 28 | 54 | 28 | 55 | 29 |
| 56 | 29 | 57 | 29 | 58 | 30 | 59 | 30 |
| 60 | 30 | 61 | 31 | 62 | 31 | 63 | 31 |

As is indicated by TABLE II, only "principal value" phase information is stored with the ARCTAN ROM table 316. That is, in order to conserve memory space the ARCTAN ROM table only includes values from one eighth of the polar plane, i.e., from zero to π/4. Accordingly, an octant adjustment module 320 operates to produce an output sequence P(n) of PHASES values by rotating each THETA value retrieved from the ARCTAN ROM table 316 to the proper octant. The octant adjustment process is formed based upon whether I>0, Q>0, and upon whether |I|>|Q|; that is, upon the values of $I_{+/-}$, $Q_{+/-}$ and $C_{I/Q}$. TABLE III sets forth the adjustment made by the octant adjustment network 320 to the THETA values associated with each combination of I+/−, $Q_{+/-}$ and $C_{I/Q}$.

TABLE III

| $C_{I/Q}$ | $I_{+/-}$ | $Q_{+/-}$ | PHASE |
|---|---|---|---|
| 0 | 0 | 0 | 1100,0000−THETA |
| 0 | 0 | 1 | 0100,0000+THETA |
| 0 | 1 | 0 | 1100,0000+THETA |
| 0 | 1 | 1 | 0100,0000−THETA |
| 1 | 0 | 0 | 1000,0000+THETA |
| 1 | 0 | 1 | 1000,0000−THETA |
| 1 | 1 | 0 | 0000,0000−THETA |
| 1 | 1 | 1 | 0000,0000+THETA |

The logical operations performed to calculate the PHASE values listed in TABLE III may be equivalently expressed as:

PHASE [7]=~$Q_{+/-}$

PHASE [6]=$I_{+/-}$ XOR $Q_{+/-}$

PHASE [5]=~$C_{I/Q}$ XOR $I_{+/-}$ XOR $Q_{+/-}$

PHASE [4 . . . 0]=~$C_{I/Q}$ XOR $I_{+/-}$ XOR $Q_{+/-}$ XOR THETA [4 . . . 0] where PHASE[i] identifies the $i^{th}$ bit of the unsigned 8-bit phase value, with bit 0 corresponding to the least significant bit.

Figure 11:
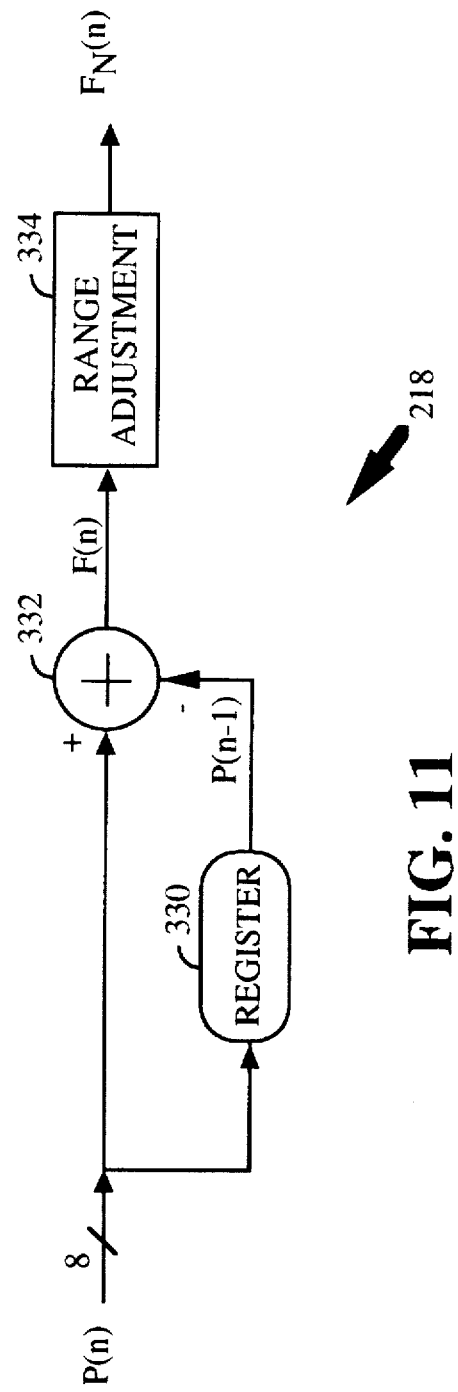
FIG. 11 is a block diagram of a preferred implementation of a phase to frequency generator also included within the I/Q FM demodulator.

Turning now to FIG. 11, there is shown a block diagram of a preferred implementation of the phase to frequency generator 218. The generator 218 is disposed to convert the sequence of phase values P(n) generated by the I/Q phase generator 214 into a normalized sequence of frequency values $F_N(n)$. Again, the differentiation function performed by the shift register 330 and digital adder 332 within the phase to frequency generator 218 may be mathematically represented as $F(n)=P(n)-P(n-1)$. A range adjustment module 334 is provided for normalizing the sample sequence F(n) to a sequence of samples $F_N(n)$, such that $-1<F_N(n)<1$. In an exemplary embodiment this range adjustment is calculated modulo 2. For example, modulo 2 range adjustment of P(n)=1.1 results in this quantity being remapped to the normalized frequency $F_N(n)=-0.9$. The modulo arithmetic removes any ambiguity in the phase difference calculation arising from phase-wrapping around the unit circle. The frequency samples are then processed by the audio decimation filter 102 and wideband data recovery network 104, both of which are described further below.

Figure 12A:
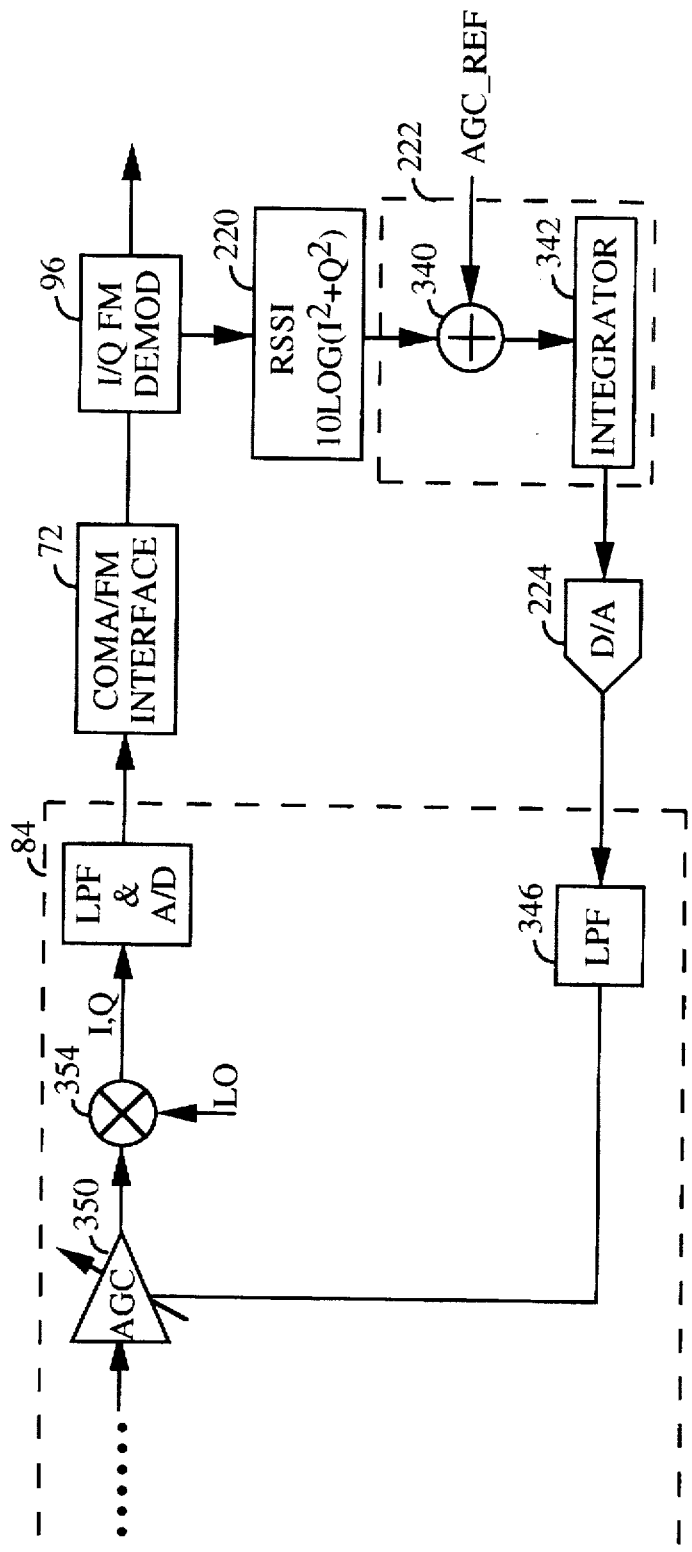
FIG. 12A depicts the architecture of a digital AGC loop operative to control IF signal amplification.

Referring to FIG. 12A, there is depicted the block diagram of a digital AGC loop operative to control amplification of the intermediate frequency (IF) signal generated within the receiver 84. The digital AGC loop is seen to include the RSSI network 220, the digital AGC network 222 and the D/A converter 224. During AGC loop operation, RSSI signals are produced by the RSSI network 220 on the basis of the |I| and |Q| values generated within the I/Q FM demodulator 96. As is indicated by FIG. 12A, a digital subtractor 340 within the AGC network 220 is provided for subtracting the reference level AGC_REF from the RSSI signal output by the RSSI table 220. The resulting error signal is integrated (342) within the loop filter, and is then supplied to the D/A converter 224.

The analog AGC signal from D/A converter 224 is filtered by a low-pass filter 346 within receiver 84, and is then utilized in adjustment of the gain of an AGC amplifier 350 within the receiver IF signal path. Amplifier 350 is capable of providing linear (dB) gain control over a high dynamic range. Amplifier 350 may be of a design described in, for example, U.S. Pat. No. 5,099,204, entitled *Linear Gain Control Amplifier*, and assigned to the Assignee of the present invention.

In order that a closed-loop AGC system be depicted in FIG. 12A, a generalized representation is presented of the baseband processing performed within receiver 84. More particularly, the level-controlled IF signal from AGC amplifier 350 is translated to a baseband frequency within mixer 354. As noted above, the frequency of the LO signal applied to the mixer 354 is selected such that the center IF frequency is mapped to a baseband frequency offset from zero Hz. The baseband signals I and Q produced by mixer 354 are then filtered and digitized within a baseband LPF & A/D network 358 prior to being sent to the CDMA/FM receiver interface 92.

Figure 12B:
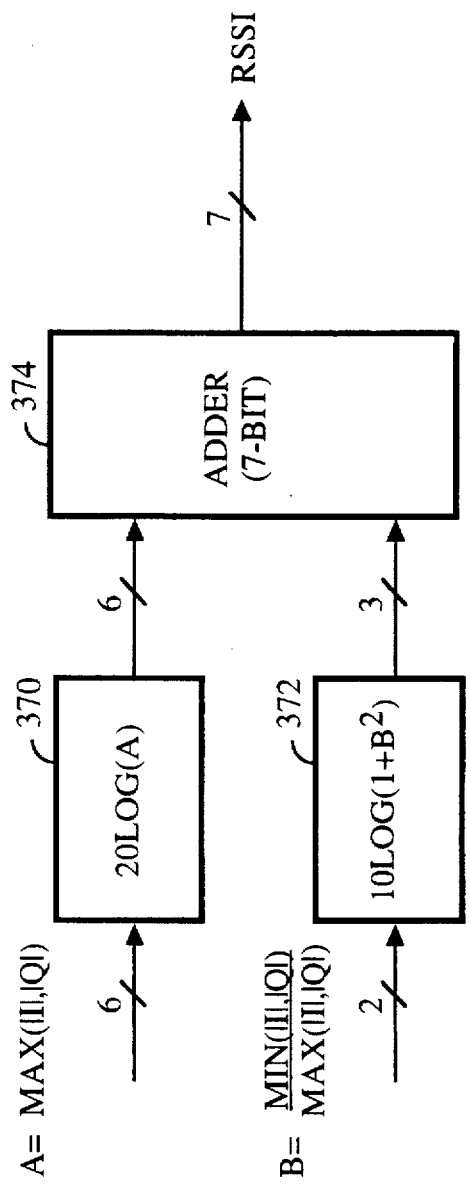
FIG. 12B is a block diagram representation of a preferred implementation of an RSSI network of the digital AGC loop.

Turning to FIG. 12B, a block diagram representation is provided of a preferred implementation of the RSSI network 220. The RSSI network 220 is operative to perform the function $10 \log_{10}(I^2+Q^2)$. This function may be alternately expressed as follows:

$$RSSI=20\log_{10}[max(|I|,|Q|)]+10\log_{10}[1+min(|I|,|Q|)^2/max(|I|,|Q|)^2]$$

The values of max(|I|,|Q|) and min(|Q|)/max(|I|,|Q|) can be efficiently obtained from the I/Q phase generator 214, since these intermediate results were also required to be determined during the phase demodulation process. The calculations of $20\log_{10}[max(I,Q)]$ and $10\log_{10}[1+min(|I|,|Q|)^2/max(|I|,|Q|)^2]$ are performed within first and second LOG function blocks 370 and 372, which may be implemented using, for example, ROM look-up tables, programmed logic array (PLA's) or conventional logic gates. The RSSI signal is then obtained by combining the outputs from the LOG function blocks 370 and 372 within a digital adder 374.

Figures 13A, 13B:
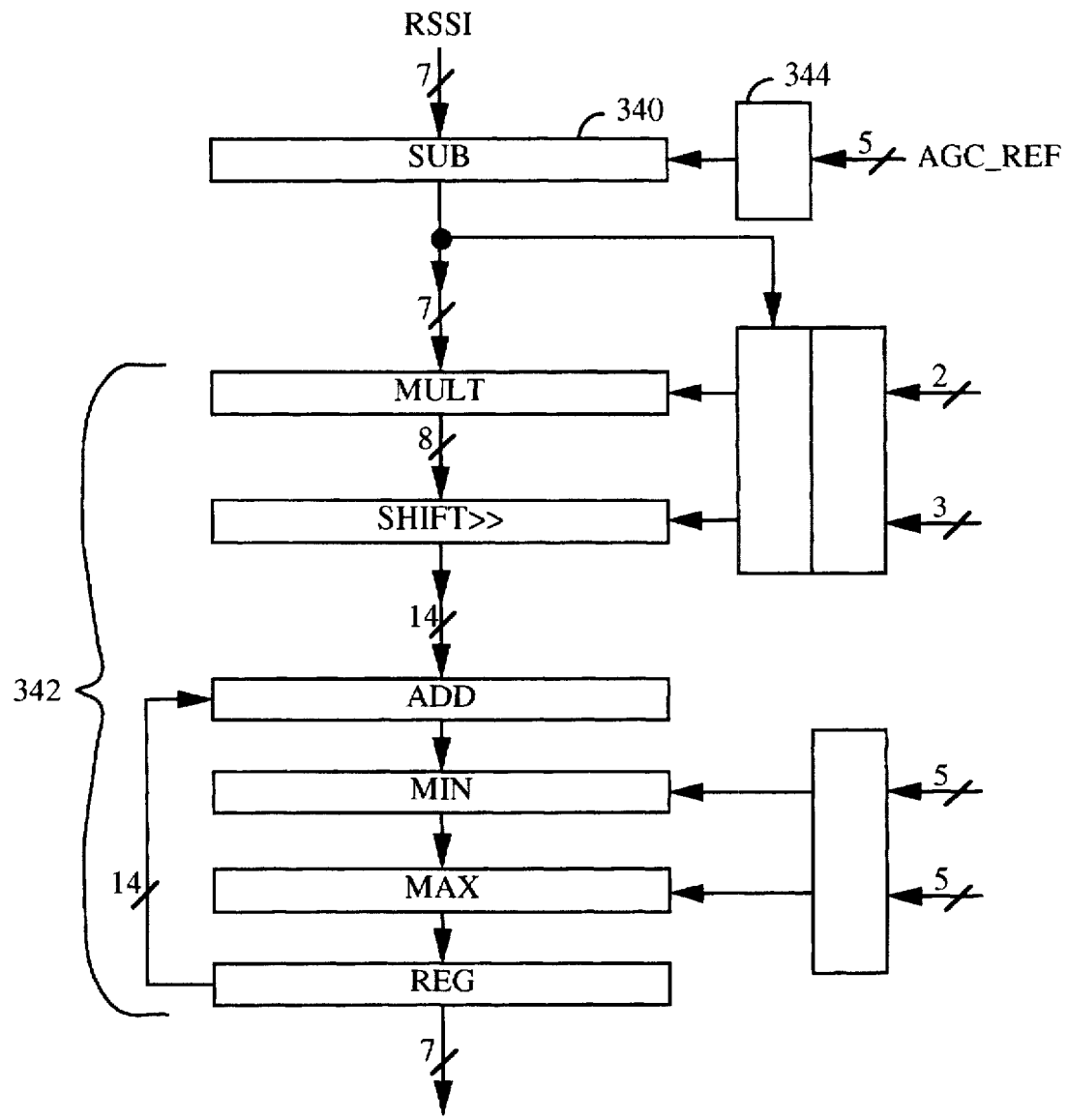
FIG. 13A depicts a preferred implementation of a digital AGC network which includes an integrator and a subtractor.
FIG. 13B is a table of AGC loop time constants corresponding to various combinations of selected AGC loop gain parameters.

FIG. 13A depicts a preferred implementation of the digital subtractor 340 and integrator 342 of the digital AGC network 222. Referring to FIG. 13A, the AGC_REF signal from register 344 is provided to subtractor 340 along with the RSSI signal from the RSSI network 220. In an exemplary implementation the AGC_REF parameter is a 5-bit constant which is loaded into the register 344 by the receiver control processor. Referring to FIG. 13A, the 5-bit predefined constant signal AGC_Ref from the control processor is provided, in conjunction with the 7-bit RSSI signal from the RSSI network 220, to the subtractor 340. The resulting magnitude difference (i.e., signal level error) between the estimated RSSI signal and the desired signal level (AGC_Ref) is scaled by the loop filter gain network 341. The loop filter gain is specified by a gain value G, where $G=0.a_1a_2 \times 2^{SHIFT}$. In an exemplary embodiment, the fractional components ($a_1a_2$) comprise 2-bit values, and the arithmetic left shift specified by the parameter SHIFT is a 3-bit value. As an example, for $a_1=1$, $a_2=1$ and SHIFT=3, the equivalent loop gain is $0.11 \times 2^{-3}$ (binary) or 3/32 (decimal).

In FIG. 13A, the fractional scaling process is implemented as full multiply and the shift process is performed as an arithmetic left shift. Two predefined constant loop gain signals, respectively identified as AGC_Attack and AGC_Decay, are provided to the AGC network. AGC_Attack and AGC_Decay each consist of a 2-bit segment representing the gain components a1 and a2, and a 3-bit segment representing the parameter SHIFT. The sign bit of the signal level error signal determines the scaling thereof by AGC_Attack and AGC_Decay. If this sign bit is positive (i.e., logic "0"), the error is scaled by the gain specified by AGC_Decay. Conversely, if the error is negative, the error is scaled by the gain specified by AGC_Attack. For positive signal level errors, the AGC loop is operative to reduce the signal level by reducing the AGC amplifier gain. In this instance the loop gain, and hence the corresponding loop time constant, are defined by the value of AGC_Decay. Similarly, in the presence of negative signal level errors the AGC loop is operative to increase the signal level by increasing the AGC amplifier gain. Under this circumstance the loop gain and time constants are defined by the value of AGC_Attack.

The selection of the loop time constants is performed in accordance with the desired balance to be achieved between the signal level tracking capability of the AGC loop, and the extent to which the baseband signal level is to remain constrained within the dynamic range of the DACs of the AGC receiver. FIG. 13B provides an indication of the parameter values corresponding to an exemplary set of loop time constants.

Turning again to FIG. 13A, the scaled 8-bit signal level error is provided to the 14-bit saturating integrator 342. In addition, 6-bit predefined saturation upper and lower saturation limits (AGC_Max, AGC_Min) of integrator 342 are provided to the AGC network by the receiver control processor. The integrator 342 is operative to force the average signal error to zero, which is equivalent to minimizing the difference between the average estimated signal level (RSSI) and the desired signal level (AGC_Ref). The saturation limits (AGC_Max, AGC_Min) will typically be chosen to correspond to the upper and lower limits of the range of the AGC amplifier control voltage. The seven most significant bits (MSBs) are extracted from the output of integrator 342 and provided to the DAC 224 (FIG. 12A) which again, operates to adjust the AGC amplifier gain.

Figure 14A:
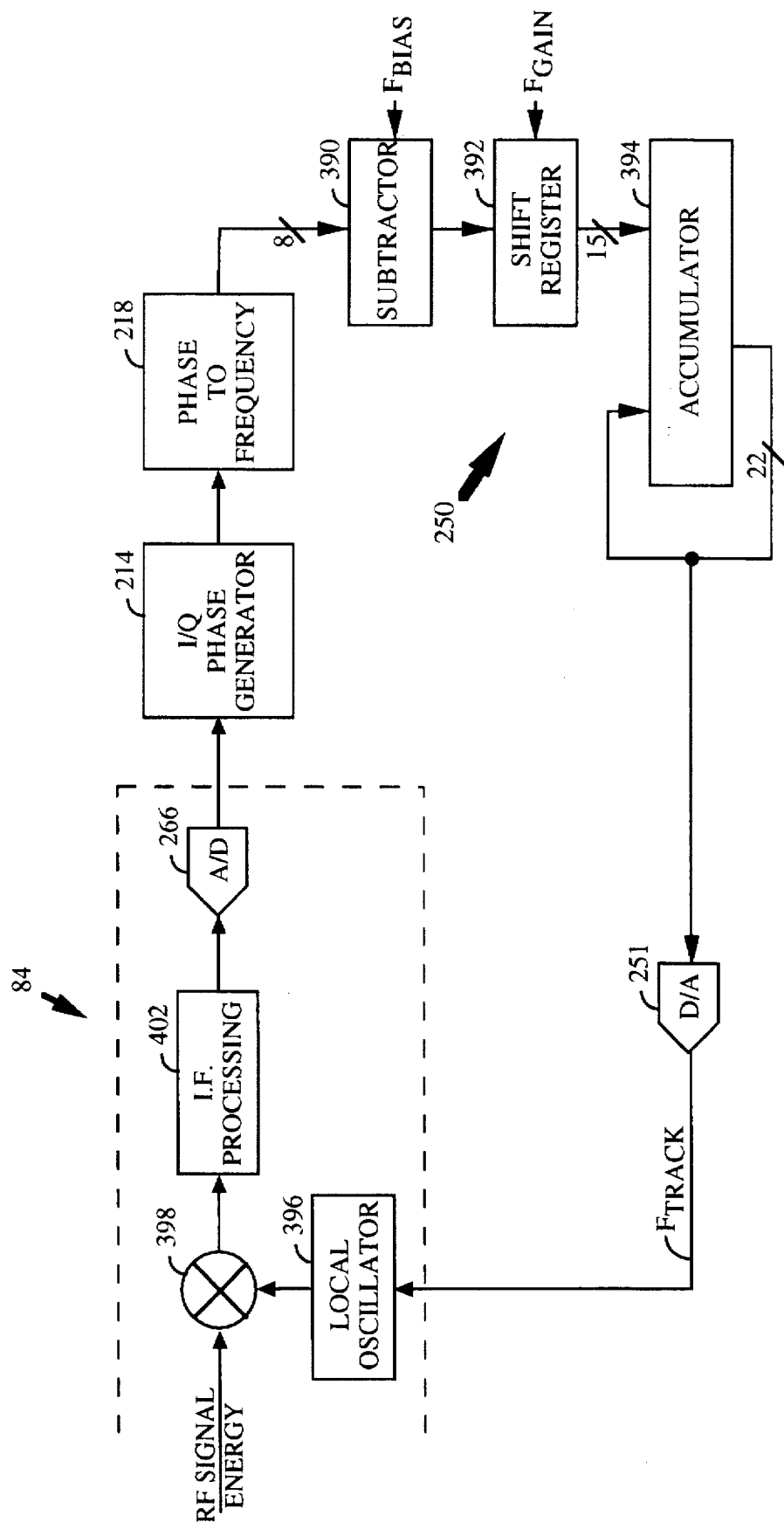
FIG. 14A illustratively represents the architecture of a preferred implementation of a frequency tracking loop included within the dual-mode receiver of the invention.

FIG. 14A illustratively represents the architecture of a preferred implementation of a frequency tracking loop included within the dual-mode receiver. Referring to FIG. 14A, the frequency tracking loop filter 250 includes a digital subtractor 390, to which is provided the 8-bit FM demodulated frequency signal from the phase to frequency generator 218. Subtractor 390 is designed to subtract the frequency bias signal ($F_{BIAS}$), which in an exemplary implementation is approximately equivalent to one frequency LSB (i.e., to 156 Hz), from the 8-bit demodulated frequency signal. The resulting difference signal is supplied to a shift register 392, and is bit-shifted in accordance with a frequency tracking loop gain constant $F_{GAIN}$. Compiled within the table of FIG. 14B are the time constants of the frequency tracking loop associated with various gain constants $F_{GAIN}$.

The sign-extended output of the shift register 392 is then sent to a digital accumulator 394. In an exemplary implementation the output from the shift register 392 is of 15-bit accuracy, and the accumulator 394 is 22 bits wide. As is indicated by FIG. 14A, the 8 MSB's output by the accumulator 394 are provided to the D/A converter 251. It is also understood that during CDMA mode operation a CDMA frequency tracking signal may be multiplexed to D/A converter 251 in lieu of the output from accumulator 394.

The frequency track signal $F_{TRACK}$ produced by D/A converter 251 is used to adjust the frequency of a local oscillator 396 included within an RF portion of the receiver 84. The receiver 84 further includes a mixer 398 for translating the frequency of the received RF signal in response to the applied frequency of the local oscillator 396. The resulting IF signal is then provided to an IF processing portion 402, the output of which is sampled by A/D converter 266 and supplied to the I/Q phase generator 214. In this way the frequency tracking loop of FIG. 14A facilitates closed-loop digital tracking of the received RF carrier frequency. Moreover, the digital realization of FIG. 14A advantageously enables the parameter $F_{GAIN}$ to be programmed so as to yield a desired loop response.

B. Audio Decimation Filter

Figure 15:
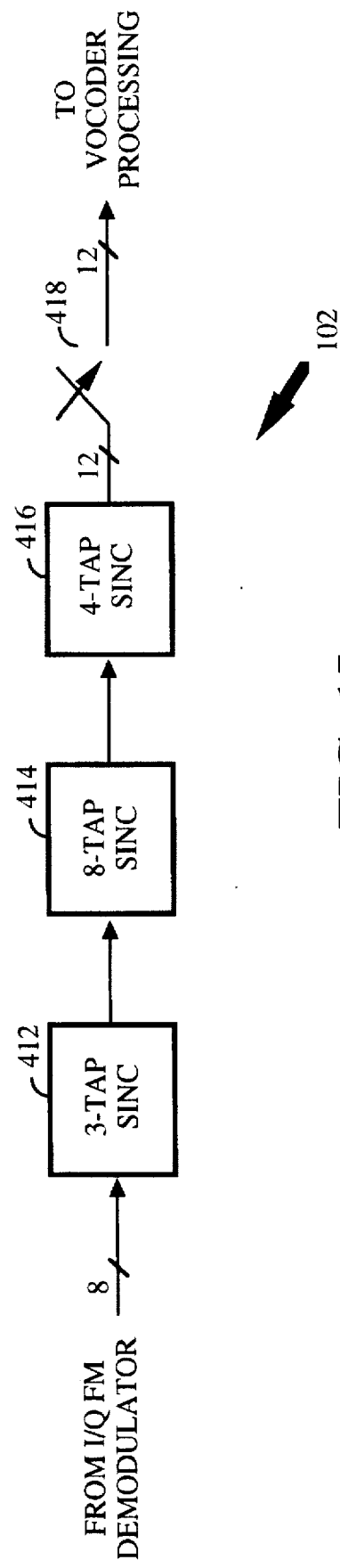
FIG. 15 provides a block diagram of a preferred implementation of an audio decimation filter included within the dual-mode receiver of the invention.

Referring now to FIG. 15, a block diagram is provided of a preferred implementation of the audio decimation filter 102. The decimation filter operates to convert the demodulated frequency signal from the I/Q FM demodulator 96 to a lower data rate. In an exemplary embodiment the 8-bit data at 40 kilosamples/second (ksps) produced by the I/Q FM demodulator is converted within the filter 102 to 12-bit data at 20 ksps.

The filter architecture of FIG. 15 relies on a set of cascaded SINC filters (i.e. $\text{sinc}(x) = {}^{sin(x)}/_x$) to achieve hardware implementation efficiency. In particular, the filter 102 includes an input 3-tap SINC filter 412 cascaded with a 2-tap $\text{SINC}^3$ filter 416. The output from the $\text{SINC}^3$ filter 416 is sub-sampled by switch 418 at the exemplary rate of 20 ksps. The filter 102 will typically be designed to provide at least 40 dB of attenuation over the frequency range from 16 to 20 kHz. This degree of attenuation may be effected by realizing the SINC filters in accordance with the following z-domain transfer functions:

| SINC Filter | Transfer Function |
| --- | --- |
| 3-tap SINC (412) | $(1 + z^{-1} + z^{-2})/4$ |
| 2-tap $\text{SINC}^3$ (416) | $(1 + z^{-1})(1 + z^{-1})(1 + z^{-1})/8$ |

C. Wideband Waveform Timing/Data Recovery

Figure 16:
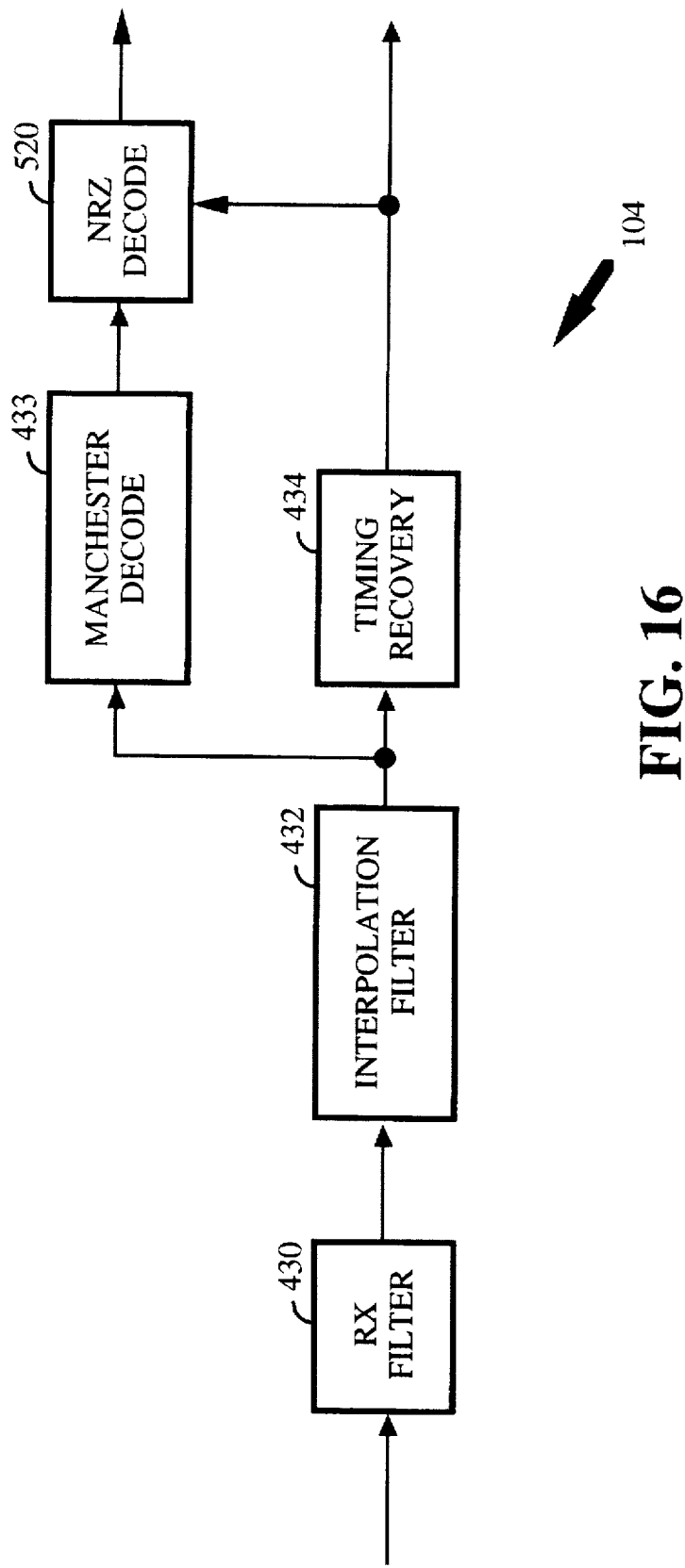
FIG. 16 illustratively represents the architecture of an exemplary implementation of a wideband data recovery network.

Turning now to FIG. 16, there is illustratively represented the architecture of an exemplary implementation of the wideband data recovery network 104. The wideband data recovery network 104 is disposed to perform timing recovery and decoding operations upon the Manchester-encoded data stream received by the dual-mode receiver 16. The network 104 includes a receiver (RX) filter 430, which approximates a matched filter for the Manchester symbol stream. In addition, the RX filter 430 band-limits the demodulated FM signal and rejects any high-frequency noise produced by the phase to frequency generator 218. In an exemplary implementation the RX filter 430 is designed to emulate the characteristics of an analog $4^{th}$-order Butterworth low-pass filter having a cut-off frequency of approximately 13 kHz. Given that the demodulated FM signal is generated by the I/Q demodulator at an exemplary 40 ksps rate, the RX filter 430 may be realized as a 2-tap SINC filter (zero at 20 ksps), having a z-domain transfer function of $(1+z^{-1})/2$.

Figure 17:
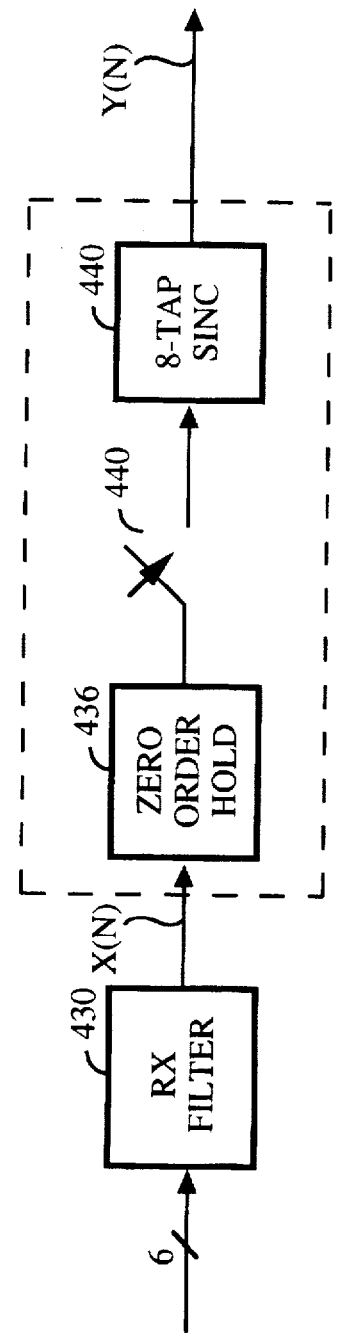
FIG. 17 is a block diagram of an interpolation filter included within the wideband data recovery network.

Referring again to FIG. 16, an interpolation filter 432 is provided for increasing the sample rate of the filtered signal produced by the RX filter 430 so as to achieve a sample resolution suitable for processing by timing recovery and Manchester decode networks 433 and 434. The interpolation filter 432 is shown in greater detail in FIG. 17, and is seen to include a zero order hold 436 for receiving the 40 ksps stream of samples from the RX filter 430. A switch 438 is provided for resampling the output of the zero order hold 436 at an exemplary rate of 320 ksps in order to provide the requisite time resolution for timing recovery and detection of the 20 kbps Manchester stream. The resultant resampled 320 ksps sample stream is filtered by an 8-tap SINC filter 440 having a transfer function of $(1+z^{-1}+\ldots+z^{-7})/8$. The resultant linearly interpolated sequence y(n) produced by the 8-tap SINC filter 440 in response to a sequence x(n) generated by the RX filter 430 may be represented as follows:

$$y(8n+k)=x(n), \text{ for } k=0;$$

and $$y(8n+k)=y(8n+k-1)+(x(n)-x(n-1))/8, \text{ for } k=1,\ldots,7$$

Figures 18A, 18B:
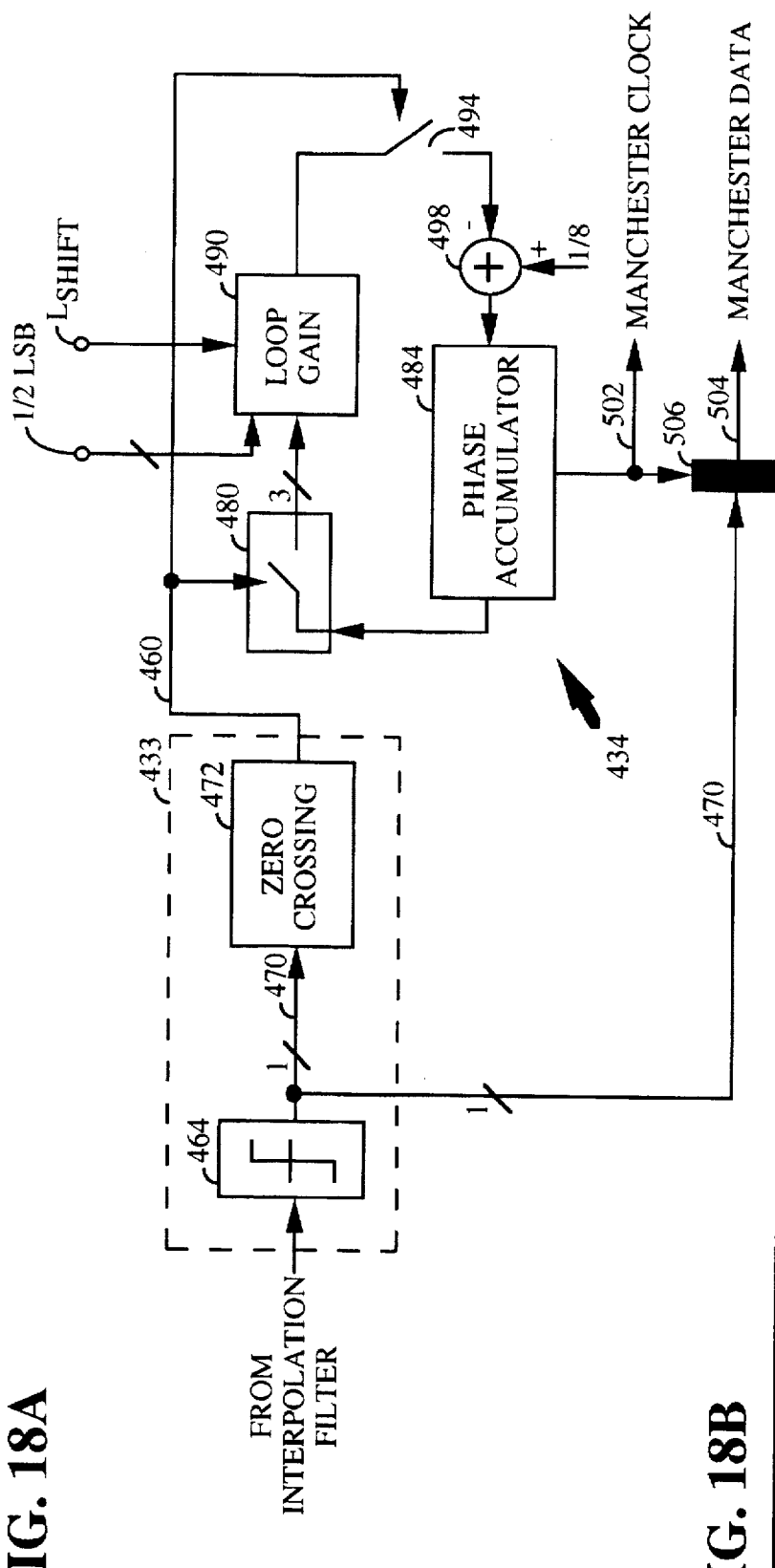
FIG. 18A shows block diagrams of timing recovery and Manchester decode networks.
FIG. 18B sets forth the time constants and loop bandwidths associated with a phase-locked loop within the Manchester decode network.

Turning now to FIG. 18A, block diagrammatic representations are provided of the timing recovery and Manchester decode networks 433 and 434. In an exemplary embodiment the Manchester decode network 434 is realized using a 1st order digital phase-locked loop (DPLL), the timing of which is governed by zero-crossings 460 produced by the timing recovery network 433. As is indicated by FIG. 18A, the timing recovery network 433 includes a data thresholding circuit 464 for providing thresholded data bits 470 at the interpolated rate of 320 ksps to a zero-crossing circuit 472. The thresholded data bits 470 are produced based on the sign of the input sample sequence. Specifically, each zero-crossing 460 is produced within zero-crossing circuit 472 by XOR'ing successive ones of the thresholded data bits 470.

The DPLL of the Manchester decode network 434 is designed to lock to the exemplary Manchester symbol rate of 20 ksps. The decode network 434 includes a zero-crossing sampled phase detector 480, which is operative to sample the output of a phase accumulator 484 upon generation of each zero-crossing 460. In a preferred embodiment the phase detector 480 produces a 3-bit error signal extracted from the 3 most significant bits (MSBs) of the phase accumulator, to which a ½ least significant bit (LSB) offset is added in order to produce an unbiased 4-bit phase error estimate. Each detected phase sample produced by the phase detector 480 is bit-shifted within a loop gain scaling register 490 in accordance with a loop gain shift ($L_{SHIFT}$) command from the receiver control processor. The magnitude of the bit-shift carried out within scaling register 490 determines the time constant and, hence, the bandwidth of the DPLL within network 434. The time constants and loop bandwidths associated with an exemplary set of $L_{SHIFT}$ values are set forth in FIG. 18B.

As is indicated by FIG. 18B, in a preferred embodiment the $L_{SHIFT}$ values range from 5 to 8, which corresponds to a loop bandwidth range of between 80 Hz to 10 Hz.

Again referring to FIG. 18A, the phase accumulator 484 is updated in identical phase increments at an exemplary rate of 320 kHz. In an exemplary implementation each fixed phase increment is selected to be ⅛, which results in the accumulator 484 ramping from −1 to +1 once every Manchester symbol of 16 clock cycles at 320 kHz. The phase accumulator 484 will generally be implemented to wrap upon overflow from ±1.

In operation, the DPLL of FIG. 18A will phase lock such that the zero-crossings 460 of the input signal coincide with zero-crossings of the ±1 output from phase accumulator 484. Although in principle this results in an average sampled phase error of zero from the phase detector 480, various factors (e.g., quantized time resolution and signal noise) ensure continuous loop operation by causing a non-zero sampled phase error. As a specific operational example, consider the case where the ±1 signal transitions from the phase accumulator 484 are "leading" the zero-crossings 460 of the input signal. In this instance the resultant positive error signal is subtracted from the next ⅛ phase increment provided to subtractor 498, thereby reducing the phase lead of the output of accumulator 484 relative to the input zero-crossings 460.

Referring to FIG. 18A, the recovered Manchester clock 502 may be derived from the sign of the phase error accumulated within accumulator 484. During phase lock, positive transitions of the recovered Manchester clock 502 correspond to inter-symbol transitions of the recovered Manchester data 504 produced by latch 506. More particularly, the Manchester data 504 is generated by latching (506) the thresholded data signal 470 on the falling edge of the recovered Manchester clock signal 502.

Figures 19A, 19B:
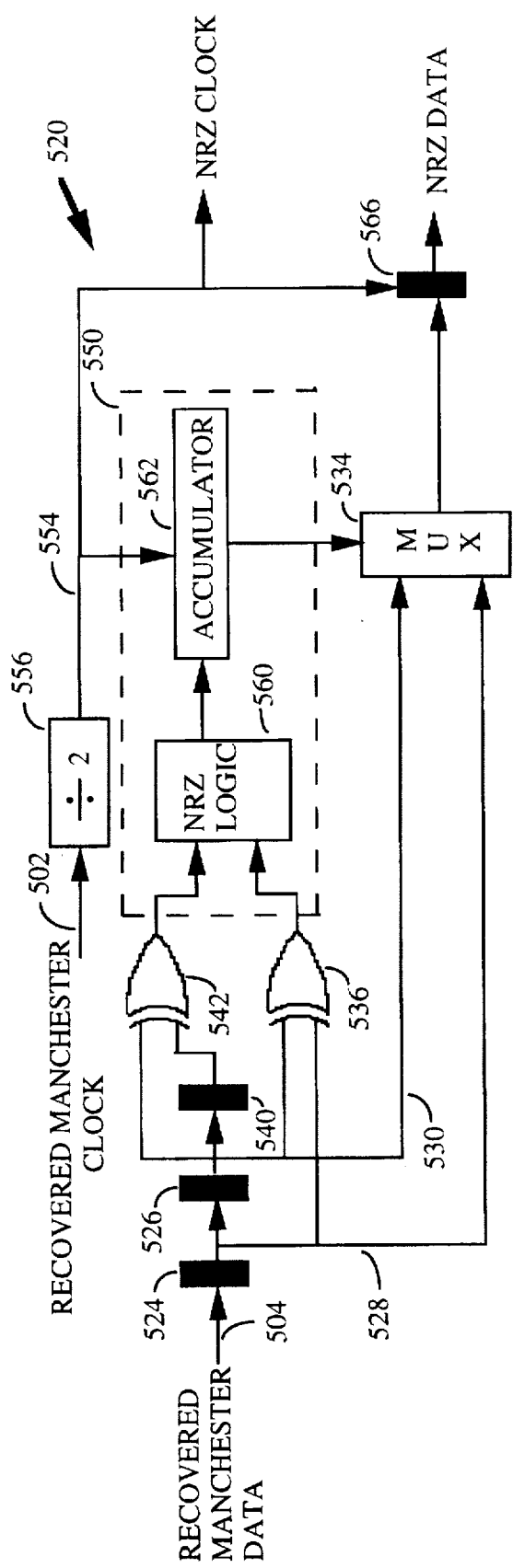
FIG. 19A provides a partially schematic representation of an NRZ decoder included within the wideband data recovery network.
FIG. 19B provides a table summarizing the operation of an NRZ logic circuit included within the NRZ decoder.

FIG. 19A provides a partially schematic representation of an NRZ decoder 520 included within the wideband data recovery network 104. Referring to FIG. 19A, the Manchester data 504 from the wideband data recovery network 104 is transferred through input shift registers 524 and 526, from which are output successive pairs of Manchester symbols on signal lines 528 and 530. Each pair of Manchester symbols is provided to multiplexer 534 and to a first XOR gate 536. The Manchester symbol 530 is also provided to a second XOR gate 542, and is further passed through input shift register 540. As is indicated by FIG. 19A, the output of register 540 is also provided to the second XOR gate 542.

In a preferred embodiment the NRZ decoder 520 includes a random walk filter (RWF) 550 disposed to recover the NRZ data and clock phase in response to the outputs of XOR gates 536 and 542. The NRZ decoder 520 is also provided with the NRZ bit clock 554, which is obtained by passing the recovered Manchester clock signal 502 through a divide-by-two circuit 556. However, direct Manchester to NRZ data conversion may not be performed solely on the basis of the timing information inherent within the NRZ bit clock 554, since there exists a 180 degree phase ambiguity between the Manchester clock 502 and the NRZ bit clock 554. In accordance with the invention, this phase ambiguity is resolved in the RWF 550 by relying on a particular error-detection property inherent of the recovered Manchester data 504. Namely, it is characteristic of a Manchester data stream that the XOR of successive Manchester symbols is always unity.

Referring to FIG. 19A, each successive pair of Manchester symbols 528 and 530 correspond to a pair of possible NRZ decoded data values. The RWF 550 is operative to select one of these NRZ values via multiplexer 534 by processing the recovered Manchester data to determine the most likely NRZ sample phase. Specifically, NRZ logic 560 within the RWF 550 accepts the outputs from exclusive-OR gates 542 and 536, which are hereinafter respectively referred to as phase validity indicators Phase 1 (P1) and Phase 2 (P2). The phase validity indicators P1 and P2 are identified with the two possible NRZ data bits 530 and 528, respectively, provided to multiplexer 534. On the rising edge of the recovered NRZ clock 554, an accumulator 562 within the RWF 550 is provided with an incrementing value (INC) incremented from NRZ logic 560.

In the preferred embodiment the incrementing value (INC) is either 0 or ±1, and is produced by the NRZ logic 560 by analyzing the phase validity indicators P1 and P2 in accordance with the Manchester error-detection property mentioned above. It is noted that for any given three successive Manchester symbols, P1 is derived by XOR'ing the first and second symbols, and P2 generated by XOR'ing the second and third symbols. The phase validity indicators P1 and P2 are "correct" when set equal to one, since this satisfies the Manchester error-detection constraint that the XOR of successive symbols be unity. When P1 is correct and P2 is incorrect, the accumulator 562 is incremented. For the converse state (i.e., P1=0 and P2=1) the accumulator 562 is decremented. If P1 and P2 are of the same value, the accumulator 562 is neither incremented nor decremented. FIG. 19B provides a table summarizing this mode of operation of the NRZ logic 560.

In an exemplary implementation the accumulator 562 is 6-bits wide, and hence saturates at −31 or +32. The correct NRZ symbol is selected by multiplexer 534 based on the sign of the value stored within the accumulator 562. In particular, a positive accumulated value results in the Manchester symbol on signal line 530 being provided to output register 566, while multiplexer 534 passes the Manchester symbol on line 528 to register 566 in response to negative accumulated value.

The NRZ decoder 520 is advantageously designed to be self-synchronizing. That is, the decoder 520 does not require initialization upon the start of system operation. In addition, the worst case "walk" to achieve the correct NRZ phase is 32 for implementations of the RWF 550 which include a 6-bit accumulator.

In a preferred implementation the serial stream of NRZ data from output register 566 may include messages of various formats encoded therein by the dual-mode transmitter 14. It is anticipated that techniques may be devised by those skilled in the art for identifying and extracting such message information from the serial NRZ data.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

We claim:

1. A dual-mode transmitter for transmitting an information signal using a frequency modulation (FM) signal when in an FM mode, and using a code division multiple access (CDMA) signal when in a CDMA mode, comprising:

a digital signal processor for generating a digital FM audio signal;

a wideband data generator, coupled to said digital signal processor, for generating a wideband data signal said wideband data generator comprising a data register for receiving a non-return to zero input data signal;

a first multiplexer, coupled to said data register, for generating a portion of said wideband data signal in response to said non-return to zero input data signal;

an inverter, coupled to said first multiplexer, for inverting said generated portion of said wideband data signal; and a second multiplexer, coupled to said inverter, said data register and said first multiplexer, for multiplexing said portion of said wideband data signal with said inverted portion of said wideband data signal, thereby generating said wideband data signal;

a combiner, coupled to said wideband data generator, for combining said wideband data signal with said digital FM audio signal, thereby producing a composite digital FM signal; and a mode switch, coupled to said combiner, for receiving said composite digital FM signal and a CDMA data signal and providing said composite digital FM signal to a transmitter when in said FM mode and providing said CDMA data signal to said transmitter when in said CDMA mode, said transmitter for upconverting and transmitting said information signal.

2. The dual-mode transmitter of claim 1 further comprising:

an audio interpolation filter, coupled to said digital signal processor and said combiner and interposed therebetween, for upsampling said digital FM audio signal; and a multiplier, coupled to said combiner and said mode switch and interposed therebetween, for scaling said composite digital FM signal.

3. A dual-mode receiver for receiving an information signal, said information signal representing a composite digital FM audio and wideband data signal when in an FM mode, and said information signal representing a code division multiple access (CDMA) data signal when in a CDMA mode, comprising:

a downconverter for downconverting said information signal, said downconverter producing in-phase (I) and quadrature-phase (Q) analog FM signals when in said FM mode, said I and Q analog FM signals being offset from zero frequency by a predetermined offset margin, and producing in-phase (I) and quadrature-phase (Q) analog CDMA signals when in said CDMA mode; and a dual-mode interface, coupled to said downconverter, for converting said I and Q analog FM signals to I and Q digital FM signals and for converting said I and Q analog CDMA signals to I and Q digital CDMA signals, said dual-mode interface further for routing said I and Q digital FM signals to a digital FM demodulator, and for routing said I and Q digital CDMA signals to a CDMA demodulator;

said CDMA demodulator, being coupled to said dual-mode interface, for digitally demodulating said I and Q digital CDMA signals, thereby recovering said CDMA data signal;

said digital FM demodulator, being coupled to said dual-mode interface, for digitally demodulating said I and Q digital FM signals, thereby recovering said composite digital FM audio and wideband data sin said digital FM demodulator comprising I and Q DC offset loop filters for digitally filtering said I and Q digital FM signals, eliminating said predetermined offset margin and producing I and Q digital FM baseband signals, each of said I and Q DC offset loop filters comprising a first extraction register for extracting a most-significant bit of said I or Q digital FM signal;

a shift register, coupled to said first extraction register, for adjusting a time constant of said DC offset loop filter;

an accumulator, coupled to said shift resister, for accumulating said extracted most-significant bits;

a second extraction register, coupled to said accumulator, for extracting a predetermined number of significant bits from said accumulated most-significant bits; and a converter, coupled to said second extraction register, for converting said extracted predetermined number of significant bits to an analog DC offset correction signal;

a digital automatic gain control network for measuring a received signal strength of said I and Q digital FM baseband signals and for altering a variable gain of said receiver in response to said received signal strength measurement; and a frequency tracking loop filter for digitally filtering said composite digital FM audio signal and wideband data signal and for adjusting a local oscillator frequency of said receiver in response to said digitally filtered composite digital FM audio signal and wideband data signal;

wideband data recovery network, coupled to said digital FM demodulator, for recovering said wideband data signal from said composite digital FM audio and wideband data signal; and a wideband message decoder, coupled to said wideband data recovery network, for decoding said wideband data signal.

4. The dual-mode receiver of claim 3 wherein said digital automatic gain control network comprises:

a received signal strength measurement circuit for calculating a received signal strength of said I and Q digital FM baseband signals based at least on a ratio of a maximum of an absolute value of either said I digital FM baseband signal or said Q digital FM baseband signal to a minimum of said absolute value of either said I digital FM baseband signal or said Q digital FM baseband signal;

a digital subtractor, coupled to said received signal strength measurement circuit, for subtracting a reference level from said calculated received signal strength, said digital subtractor producing a digital AGC error signal;

an integrator, coupled to said digital subtractor, for integrating said digital AGC error signal between an upper saturation limit and a lower saturation limit; and a converter, coupled to said integrator, for converting the integrated digital AGC error signal to an analog AGC error signal.

5. The dual-mode receiver of claim 3 wherein said frequency tracking loop filter comprises:

a digital subtractor for subtracting a reference frequency from a frequency of said composite digital FM audio signal and wideband data signal, thereby producing a digital frequency error signal;

a shift register, coupled to said digital subtractor, for adjusting a time constant of said frequency tracking loop filter in response to a gain signal;

an accumulator, coupled to said shift register, for accumulating the shifted digital frequency error signal; and a converter, coupled to said accumulator, for converting the accumulated shifted, digital frequency error signal to an analog frequency error signal.

6. The dual-mode receiver of claim 3 wherein said wideband data recovery network comprises:

a digital phase-lock loop for recovering a Manchester-encoded non-return to zero (NRZ) data signal from a composite digital FM audio and wideband data signal; and a NRZ decoder for decoding said Manchester-encoded NRZ data signal.

* * * * *